United States Patent
Da Silva et al.

(10) Patent No.: US 12,317,224 B2
(45) Date of Patent: May 27, 2025

(54) RESUME IN PAGING

(71) Applicant: Telefonaktiebolaget LM Ericsson (publ), Stockholm (SE)

(72) Inventors: Icaro L. J. Da Silva, Solna (SE); Magnus Stattin, Upplands Väsby (SE); Gunnar Mildh, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 615 days.

(21) Appl. No.: 17/625,829

(22) PCT Filed: Jul. 2, 2020

(86) PCT No.: PCT/SE2020/050695
§ 371 (c)(1),
(2) Date: Jan. 10, 2022

(87) PCT Pub. No.: WO2021/010880
PCT Pub. Date: Jan. 21, 2021

(65) Prior Publication Data
US 2022/0264518 A1    Aug. 18, 2022

Related U.S. Application Data

(60) Provisional application No. 62/873,300, filed on Jul. 12, 2019.

(51) Int. Cl.
*H04W 68/00*    (2009.01)
*H04W 36/00*    (2009.01)
(Continued)

(52) U.S. Cl.
CPC ..... *H04W 68/005* (2013.01); *H04W 36/0088* (2013.01); *H04W 52/0229* (2013.01); *H04W 76/27* (2018.02)

(58) Field of Classification Search
CPC ............... H04W 68/005; H04W 76/27; H04W 36/0088; H04W 52/0229
See application file for complete search history.

(56) References Cited

U.S. PATENT DOCUMENTS

| 2018/0192371 A1 | 7/2018 | Jung et al. |
| 2019/0289570 A1* | 9/2019 | Kim ............... H04W 76/10 |
| 2020/0100312 A1 | 3/2020 | Hapsari et al. |

FOREIGN PATENT DOCUMENTS

| KR | 20190116885 A | 10/2019 |
| WO | 2018034599 A1 | 2/2018 |

(Continued)

OTHER PUBLICATIONS

"Further considerations on RAN and CN paging in Inactive", 3GPP TSG-RAN WG2 #97bis, Tdoc R2-1702815, Spokane, U.S., Apr. 3-7, 2017, 5 pages.

(Continued)

*Primary Examiner* — Justin Y Lee
(74) *Attorney, Agent, or Firm* — Weisberg I.P. Law, P.A.

(57) ABSTRACT

A wireless device performs a method for resuming a Radio Resource Control, RRC, connection. While in a power saving state, the wireless device monitors a paging 5channel. When the wireless device receives a paging message on the paging channel, it determines whether the paging channel includes a message enabling the wireless device to resume the RRC connection. If the paging channel includes a message enabling the wireless device to resume the RRC connection, the wireless device performs actions determined by said message.

23 Claims, 21 Drawing Sheets

(51) Int. Cl.
*H04W 52/02* (2009.01)
*H04W 76/27* (2018.01)

(56) References Cited

FOREIGN PATENT DOCUMENTS

| WO | 2018084761 A1 | 5/2018 |
|----|---------------|--------|
| WO | 2018172943 A1 | 9/2018 |
| WO | 2018198176 A1 | 11/2018 |
| WO | 2019160475 A1 | 8/2019 |

OTHER PUBLICATIONS

3GPP, "3rd Generation Partnership Project; Technical Specification Group Radio Access Network; NR; Physical layer procedures for control (Release 15)", 3GPP TS 38.213 V15.6.0, Jun. 2019, 1-107.

3GPP, "3GPP TS 24.501 V16.1.0", Non-Access-Stratum (NAS) protocol for 5G System (5GS); Stage 3, Jun. 2019, 1-541.

3GPP, "3GPP TS 38.304 V15.4.0", 3rd Generation Partnership Project; Technical Specification Group Radio Access Network; NR; User Equipment (UE) procedures in Idle mode and RRC Inactive state (Release 15), Jun. 2019, 1-29.

3GPP, "3rd Generation Partnership Project; Technical Specification Group Radio Access Network; NR; Radio Resource Control (RRC) protocol specification (Release 15)", 3GPP TS 38.331 V15.6.0, Jun. 2019, 1-519.

3GPP, "3rd Generation Partnership Project; Technical Specification Group Services and System Aspects; Security architecture and procedures for 5G system (Release 15)", 3GPP TS 33.501 V15.5.0, 2019-06, 1-190.

Qualcomm Incorporated, "KI#1: Addressing Early Data Transmission with Immediate RRC completion in solution 19", SA WG2 Meeting #129bis, S2-1811701 (was S2-181xxyy), West Palm Beach, USA, Nov. 26-30, 2018, 1-13.

\* cited by examiner

RESUME IN PAGING

TECHNICAL FIELD

This disclosure relates to methods and devices for allowing a wireless device to resume a Radio Resource Control, RRC, connection in a wireless communications network.

BACKGROUND

More specifically, this disclosure relates to issues relating to paging, and to monitoring of paging while a User Equipment (UE) is in an inactive state.

In wireless communications networks operating in accordance with the Long-Term Evolution (LTE) or New Radio (NR) standards, paging allows the network to reach UEs in RRC_IDLE and in RRC_INACTIVE state, and to notify UEs in RRC_IDLE, RRC_INACTIVE and RRC_CONNECTED state of system information changes and ETWS/CMAS indications. RRC refers to the Radio Resource Control protocol layer.

In RRC_IDLE the UE monitors the paging channels for Core Network (CN)-initiated paging (e.g. with a CN paging identifier). In RRC_INACTIVE the UE monitors paging channels for Radio Access Network (RAN)-initiated paging, for example with a RAN paging identifier, such as the Inactive Radio Network Temporary Identifier (I-RNTI). A UE need not monitor paging channels continuously though; Paging Discontinuous Reception (DRX) is defined where the UE in RRC_IDLE or RRC_INACTIVE is only required to monitor paging channels during one Paging Occasion (PO) per DRX cycle (as defined in TS 38.304). The Paging DRX cycles are configured by the network:
  For CN-initiated paging, a default cycle is broadcast in system information;
  For CN-initiated paging, a UE specific cycle can be configured via Non-access stratum (NAS) signalling;
  For RAN-initiated paging, a UE-specific cycle is configured via RRC signalling;
  The UE uses the shortest of the DRX cycles applicable i.e. a UE in RRC_IDLE uses the shortest of the first two cycles above, while a UE in RRC_INACTIVE uses the shortest of the three.

The POs of a UE for CN-initiated and RAN-initiated paging are based on the same UE Identifier (ID), resulting in overlapping POs for both states. The number of different POs in a DRX cycle is configurable via system information and a network may distribute UEs to those POs based on their IDs.

Paging is defined as an RRC message. It is transmitted in Radio Link Control—Service Access Point Transparent Mode (RLC-SAP TM) and over a Paging Control Channel (PCCH), whose lower layer configuration(s) are broadcast in system information.

To receive paging messages from the Evolved Universal Terrestrial Radio Access Network (E-UTRAN), UEs in idle mode monitor the Physical Downlink Control Channel (PDCCH) channel for a Radio Network Temporary Identifier (RNTI) value used to indicate paging: the Paging Radio Network Temporary Identifier (P-RNTI) (see Section 9.2.2.2). The UE only needs to monitor the PDCCH channel at certain UE-specific occasions (i.e. at specific subframes within specific radio frames—see Section 6.2 for an introduction to the LTE radio frame structure.). At other times, the UE may apply DRX, meaning that it can switch off its receiver to preserve battery power.

Paging is transmitted as: a Downlink Control Information (DCI) on the common PDCCH addressed to a special identifier called the P-RNTI, allocating Physical Downlink Shared Channel (PDSCH) resources for transmission of a Paging RRC message, containing a list of max 32 UE paging IDs. A UE has to decode the Paging RRC message to find out whether it is paged. Paging may be configured in multiple Bandwidth Parts (BWPs), but only the initial BWP is used for RRC_INACTIVE and RRC_IDLE UEs.

In RRC_IDLE, the UE monitors one PO in its DRX cycle (also known as its paging cycle). The DRX cycle is the smallest of a default DRX cycle configured in system information (SI) and a possible UE specific DRX cycle sent from the UE to the Access and Mobility Management Function (AMF) in the Registration NAS message. The UE monitors CN paging and SI update notifications. In RRC_INACTIVE, the UE monitors one PO in its DRX cycle, configured by the anchor base station (for example a gNB in NR) in the RRCRelease message. The RAN paging cycle can be shorter than the CN paging cycle, but every CN PO must coincide with a RAN PO. In RRC_CONNECTED the UE monitors any PO, but at least one during each SI modification period. The UE only monitors SI update notifications, i.e. it does not have to decode the PDSCH.

When it comes to the exact transmission scheme of paging messages, some concepts exist in NR. A paging frame (PF) is defined as a frame with 1, 2 or 4 associated paging occasions (POs). The UE monitors one paging occasion (PO) per DRX cycle. A PO is a set of PDCCH monitoring occasions (MOs) and can consist of multiple time slots (e.g. subframes or Orthogonal Frequency Division Multiplexing (OFDM) symbols) where paging DCI can be sent (TS 38.213). In multi-beam operations, the UE assumes that the same paging message is repeated in all transmitted beams and thus the selection of the beam(s) for the reception of the paging message is up to UE implementation. The paging message is same for both RAN initiated paging and CN initiated paging.

The number of PDCCH monitoring occasions for each PO is equal to the number of Synchronisation Signal Blocks (SSBs) in the cell. And there can be different manners to configure these PDCCH paging occasions:
  Non-default association—the pagingSearchSpace is configured and its searchSpaceId is not set to 0:
  The PDCCH monitoring occasions configured by the pagingSearchSpace, excluding PDCCH monitoring occasions overlapping with Uplink (UL) symbols, are sequentially numbered from 0 starting with the first PDCCH monitoring occasion following the start of the PF.
  If the firstPDCCH-MonitoringOccasionOfPO parameter is configured in the first System Information Block (SIB1), with one value for each PO associated with the PF, it points out the first of a set of S consecutively numbered PDCCH monitoring occasions for each PO. There may be unused PDCCH monitoring occasions before the first PO and between the POs.
  Otherwise, the POs are packed back to back from the first numbered PDCCH monitoring occasion in the PF, i.e. the PO with index i_s consists of a set of S consecutively numbered PDCCH monitoring occasions starting at number i_s*S.
  Non-default association—the pagingSearchSpace is configured and its searchSpaceId is not set to 0:
  The PDCCH monitoring occasions for paging are the same as for remaining minimum system information (RMSI), determined as described in chapter 13 of TS 38.213, based on the index provided in pdcch-ConfigSIB1 in the Master Information Block (MIB).

Some examples are shown below.

Specifically, FIG. 1 shows the PDCCH monitoring occasion grouping for paging occasions, in the case of an example with 2 paging occasions per frame and 4 beams.

Thus, FIG. 1 shows a paging frame 100, consisting of multiple slots, which includes multiple OFDM symbols, where the OFDM symbols that may be monitored are shown shaded. The potential PDCCH monitoring occasions are numbered 0, 1, 2, . . . , 59.

As shown at 102, the first paging occasion starts at monitoring occasion 3 and includes monitoring occasions 3-6. As shown at 104, the second paging occasion starts at monitoring occasion 33 and includes monitoring occasions 33-36.

Similarly, FIG. 2 shows the PDCCH monitoring occasion grouping for paging occasions, in the case of examples with 4 paging occasions per frame and 8 beams.

Thus, FIG. 2 shows a first example of a paging frame 200, consisting of multiple slots, which includes multiple OFDM symbols, and multiple potential PDCCH monitoring occasions. The paging frame 200 is an example with first PDCCH-Monitoring OccasionOfPO, and, as shown at 202, the four paging occasions PO1, PO2, PO3, and PO4 start at monitoring occasions 0, 15, 30, and 45 respectively.

FIG. 2 also shows a second example of a paging frame 210, again consisting of multiple slots, which includes multiple OFDM symbols, and multiple potential PDCCH monitoring occasions. The paging frame 210 is an example without first PDCCH-Monitoring OccasionOfPO, and shows the four paging occasions PO1, PO2, PO3, and PO4.

FIG. 3 shows an overview of a UE performing the monitoring for a paging message in its POs during its DRX cycles and the procedure when the UE responds to paging (in this particular example a CN initiated paging).

When the UE is camping on a cell (while in any of the power saving states, such as Idle or Inactive), the UE monitors the paging channel for that cell. And, in the case the UE is in Inactive state, the reception of a paging message addressed to a given Inactive UE leads that UE to initiate a Resume procedure in that cell in the success case (i.e. when network triggers RAN paging for an Inactive UE), as shown below, as captured in TS 38.331:

1> if in RRC_IDLE, for each of the PagingRecord, if any, included in the Paging message:
2> if the ue-Identity included in the PagingRecord matches the UE identity allocated by upper layers:
3> forward the ue-Identity and accessType (if present) to the upper layers;
1> if in RRC_INACTIVE, for each of the PagingRecord, if any, included in the Paging message:
2> if the ue-Identity included in the PagingRecord matches the UE's stored full-RNTI:
3> if the UE is configured by upper layers with Access Identity 1:
4> initiate the RRC connection resumption procedure according to 5.3.13 with resumeCause set to mps-PriorityAccess;
3> else if the UE is configured by upper layers with Access Identity 2:
4> initiate the RRC connection resumption procedure according to 5.3.13 with resumeCause set to mcs-PriorityAccess;
3> else if the UE is configured by upper layers with one or more Access Identities equal to 11-15:
4> initiate the RRC connection resumption procedure according to 5.3.13 with resumeCause set to high PriorityAccess;
3> else:
4> initiate the RRC connection resumption procedure according to 5.3.13 with resumeCause set to mt-Access;
2> else if the ue-Identity included in the PagingRecord matches the UE identity allocated by upper layers:
3> forward the ue-Identity to upper layers and accessType (if present) to the upper layers;
3> perform the actions upon going to RRC_IDLE as specified in 5.3.11 with release cause 'other'.

Paging

The Paging message is used for the notification of one or more UEs.

Signalling radio bearer: N/A
RLC-SAP: TM
Logical channel: PCCH
Direction: Network to UE
Paging message

```
-- ASN1START
-- TAG-PAGING-START
Paging ::=            SEQUENCE {
    pagingRecordList         PagingRecordList     OPTIONAL, -- Need N
    lateNonCriticalExtension OCTET STRING         OPTIONAL,
    nonCriticalExtension     SEQUENCE{ }          OPTIONAL
}
PagingRecordList ::=      SEQUENCE (SIZE(1..maxNrofPageRec)) OF PagingRecord
PagingRecord ::=          SEQUENCE {
    ue-Identity        PagingUE-Identity,
    accessType               ENUMERATED {non3GPP}  OPTIONAL, -- Need N
    ...
}
PagingUE-Identity ::=     CHOICE {
    ng-5G-S-TMSI             NG-5G-S-TMSI,
    fulll-RNTI         I-RNTI-Value,
    ...
}
-- TAG-PAGING-STOP
-- ASN1STOP
```

Reception of the Paging Message by the UE

Upon receiving the Paging message, the UE shall:

As mentioned above, the RRC connection resume procedure is described in section 5.3.13 of the standard.

FIG. 4 illustrates the successful RRC connection resume procedure, as shown in section 5.3.13 of the standard.

The purpose of the procedure is to resume a suspended RRC connection, including resuming SRB(s) and DRB(s) or perform an RNA update.

The standard describes the initiation procedure in section 5.3.13.2.

Initiation

The UE initiates the procedure when upper layers or AS (when responding to RAN paging or upon triggering RNA updates while the UE is in RRC_INACTIVE) requests the resume of a suspended RRC connection.

The UE shall ensure having valid and up to date essential system information as specified in clause 5.2.2.2 before initiating this procedure.

Upon initiation of the procedure, the UE shall:

1> if the resumption of the RRC connection is triggered by response to NG-RAN paging:
2> select '0' as the Access Category;
2> perform the unified acccess control procedure as specified in 5.3.14 using the selected Access Category and one or more Access Identities provided by upper layers;
3> if the access attempt is barred, the procedure ends;
. . .
1> release the MCG SCell(s) from the UE Inactive AS context, if stored;
1> apply the default L1 parameter values as specified in corresponding physical layer specifications, except for the parameters for which values are provided in SIB1;
1> apply the default SRB1 configuration as specified in 9.2.1;
1> apply the default MAC Cell Group configuration as specified in 9.2.2;
1> release delayBudgetReportingConfig from the UE Inactive AS context, if stored;
1> stop timer T342, if running;
1> release overheatingAssistanceConfig from the UE Inactive AS context, if stored;
1> stop timer T345, if running;
1> apply the CCCH configuration as specified in 9.1.1.2;
1> apply the timeAlignmentTimerCommon included in SIB1;
1> start timer T319;
1> set the variable pendingRnaUpdate to false; 1> initiate transmission of the RRCResumeRequest message or RRCResumeRequest1 in accordance with 5.3.13.3.

Section 5.3.13.3 sets out the actions related to transmission of RRCResumeRequest or RRCResumeRequest1 message:

The UE shall set the contents of RRCResumeRequest or RRCResumeRequest1 message as follows:

1> if field useFullResumeID is signalled in SIB1:
2> select RRCResumeRequest1 as the message to use;
2> set the resumeIdentity to the stored fullI-RNTI value;
1> else:
2> select RRCResumeRequest as the message to use;
2> set the resumeIdentity to the stored shortI-RNTI value;
1> restore the RRC configuration and AS security context from the stored UE Inactive AS context except the masterCellGroup;
1> set the resumeMAC-I to the 16 least significant bits of the MAC-I calculated:
2> over the ASN.1 encoded as per clause 8 (i.e., a multiple of 8 bits) VarResumeMAC-Input;
2> with the KRRCint key in the UE Inactive AS Context and the previously configured integrity protection algorithm; and
2> with all input bits for COUNT, BEARER and DIRECTION set to binary ones;
1> restore the RRC configuration and the KgNB and KRRCint keys from the UE Inactive AS context except the masterCellGroup and pdcp-Config;
1> derive the KgNB key based on the current KgNB key or the NH, using the stored nextHopChainingCount value, as specified in TS 33.501 [11];
1> derive the KRRCenc key, the KRRCint key, the KUPint key and the KUPenc key;
1> configure lower layers to apply integrity protection for all radio bearers except SRB0 using the configured algorithm and the KRRCint key and KU Pint key derived in this subclause immediately, i.e., integrity protection shall be applied to all subsequent messages received and sent by the UE;

NOTE 1: Only DRBs with previously configured UP integrity protection shall resume integrity protection.

1> configure lower layers to apply ciphering for all radio bearers except SRB0 and to apply the configured ciphering algorithm, the KRRCenc key and the KUPenc key derived in this subclause, i.e. the ciphering configuration shall be applied to all subsequent messages received and sent by the UE;
1> re-establish PDCP entities for SRB1;
1> resume SRB1;
1> submit the selected message RRCResumeRequest or RRCResumeRequest1 for transmission to lower layers.

NOTE 2: Only DRBs with previously configured UP ciphering shall resume ciphering.

If lower layers indicate an integrity check failure while T319 is running, perform actions specified in 5.3.13.5.

The UE shall continue cell re-selection related measurements as well as cell re-selection evaluation.

Section 5.3.13.4 describes reception of the RRCResume by the UE:

The UE shall:
1> stop timer T319;
1> stop timer T380, if running;
1> if the RRCResume includes the fullConfig:
2> perform the full configuration procedure as specified in 5.3.5.11;
1> else:
2> restore the masterCellGroup and pdcp-Config from the UE Inactive AS context;
1> discard the UE Inactive AS context except the ranNotificationAreaInfo;
1> if the RRCResume includes the masterCellGroup:
2> perform the cell group configuration for the received masterCellGroup according to 5.3.5.5;
1> if the RRCResume includes the radioBearerConfig:
2> perform the radio bearer configuration according to 5.3.5.6;
1> resume SRB2 and all DRBs;
1> if stored, discard the cell reselection priority information provided by the cellReselectionPriorities or inherited from another RAT;
1> stop timer T320, if running;
1> if the RRCResume message includes the measConfig:
2> perform the measurement configuration procedure as specified in 5.5.2;
1> resume measurements if suspended;
1> if T390 is running:
2> stop timer T390 for all access categories;

2> perform the actions as specified in 5.3.14.4;
1> if T302 is running:
2> stop timer T302;
2> perform the actions as specified in 5.3.14.4;
1> enter RRC_CONNECTED;
1> indicate to upper layers that the suspended RRC connection has been resumed;
1> stop the cell re-selection procedure;
1> consider the current cell to be the PCell;
1> set the content of the of RRCResumeComplete message as follows:
2> if the upper layer provides NAS PDU, set the dedicatedNAS-Message to include the information received from upper layers;
2> if the upper layer provides a PLMN, set the selected PLMN-Identity to PLMN selected by upper layers (TS 24.501 [23]) from the PLMN(s) included in the plmn-IdentityList in SIB1;
2> if the masterCellGroup contains the reportUplinkTxDirectCurrent:
3> include the uplinkTxDirectCurrentList;
1> submit the RRCResumeComplete message to lower layers for transmission;
1> the procedure ends.

FIG. 5 is a flow diagram summarizing this procedure.

Paging optimizations may be provided on the network side. For example, for UEs in CM_IDLE, at UE context release, the NG-RAN node may provide the AMF with a list of recommended cells and NG-RAN nodes as assistance info for subsequent paging. The AMF may also provide Paging Attempt Information consisting of a Paging Attempt Count and the Intended Number of Paging Attempts and may include the Next Paging Area Scope. If Paging Attempt Information is included in the Paging message, each paged NG-RAN node receives the same information during a paging attempt. The Paging Attempt Count shall be increased by one at each new paging attempt. The Next Paging Area Scope, when present, indicates whether the AMF plans to modify the paging area currently selected at next paging attempt. If the UE has changed its state to CM CONNECTED the Paging Attempt Count is reset. Paging optimization for UEs in RRC_INACTIVE: at RAN Paging, the serving NG-RAN node provides RAN Paging area information. The serving NG-RAN node may also provide RAN Paging attempt information. Each paged NG-RAN node receives the same RAN Paging attempt information during a paging attempt with the following content: Paging Attempt Count, the intended number of paging attempts and the Next Paging Area Scope. The Paging Attempt Count shall be increased by one at each new paging attempt. The Next Paging Area Scope, when present, indicates whether the serving NG_RAN node plans to modify the RAN Paging Area currently selected at next paging attempt. If the UE leaves RRC_INACTIVE state the Paging Attempt Count is reset.

There currently exist certain challenges.

As described above, the UE monitors paging occasions (POs) while in the INACTIVE state. If the network decides to resume a connection, e.g. if there is incoming data at the downlink that arrives at the last serving gNodeB (i.e., the gNodeB responsible for the latest cell the UE was suspended to RRC_INACTIVE), the gNodeB will try to page the UE.

In the typical case, the last serving gNodeB, knowing the RAN Notification Area Configuration (RANAC) at the UE, knows where the UE may be. However, the last serving gNodeB may first try to page the UE in the last serving cell assuming the UE may be static (as a possibly smart paging implementation).

FIG. 6 shows the procedure that may be followed when the UE is in a power saving state (for example, is Inactive), and the network has downlink (DL) data for the UE.

Upon receiving a paging message 601, addressed in one of its PO (with a P-RNTI on PDCCH) and identified by an I-RNTI in the paging message, an Inactive UE initiates a resume procedure by selecting Random Access Channel (RACH) resources and selecting a RACH occasion, which in the best case is the first available RACH occasion associated to the selected beam e.g. SSB resource, as shown at 602. As shown at 603, the UE then transmits a random-access preamble, then receives a random access response 604 (before the RAR time window expires), and based on the UL grant in the RAR, transmitting an RRC Resume Request like message 605 (e.g. RRCResumeRequest) using default configuration e.g. for L1 and MAC.

In response, the UE may receive an RRC Resume like message 606 (e.g. RRCResume as defined in NR RRC specifications) possibly including DL data 607 multiplexed with it. Then, as shown at 608, the UE enters the Connected state, and transmits an RRC Resume Complete like message 609, possibly including UL data 610 multiplexed with that.

Hence, even though the network had available DL data and knew which configuration to use to transmit that data even before paging the UE, the network can only transmit that data after the UE sends an RRC Resume Request like message. This increases the latency for DL data reception, and for any UL reception that may be needed in response to that DL data. The time that it takes until the UE receives DL data from the network is indicated at 611.

SUMMARY

According to a first aspect of the invention, there is provided a method performed by a wireless device for resuming a Radio Resource Control, RRC, connection. While in a power saving state, the wireless device monitors a paging channel. When it receives a paging message on the paging channel, the wireless device determines whether the paging channel includes a message enabling the wireless device to resume the RRC connection. If the paging channel includes a message enabling the wireless device to resume the RRC connection, the wireless device performs actions determined by said message.

According to a second aspect of the invention, there is provided a method performed by a base station for causing a wireless device to resume a Radio Resource Control, RRC, connection. The base station transmits a paging message to a wireless device that is in a power saving state, on a paging channel. The base station includes a message enabling the wireless device to resume the RRC connection on the paging channel.

According to a third aspect of the invention, there is provided a wireless device, comprising a processor and a memory, wherein the wireless device is configured for performing a method according to the first aspect of the invention.

According to a fourth aspect of the invention, there is provided a base station, comprising a processor and a memory, wherein the base station is configured for causing a method according to the second aspect of the invention to be performed.

Thus, certain aspects of the present disclosure and their embodiments may provide solutions to these or other challenges.

DETAILED DESCRIPTION

Figure 1:
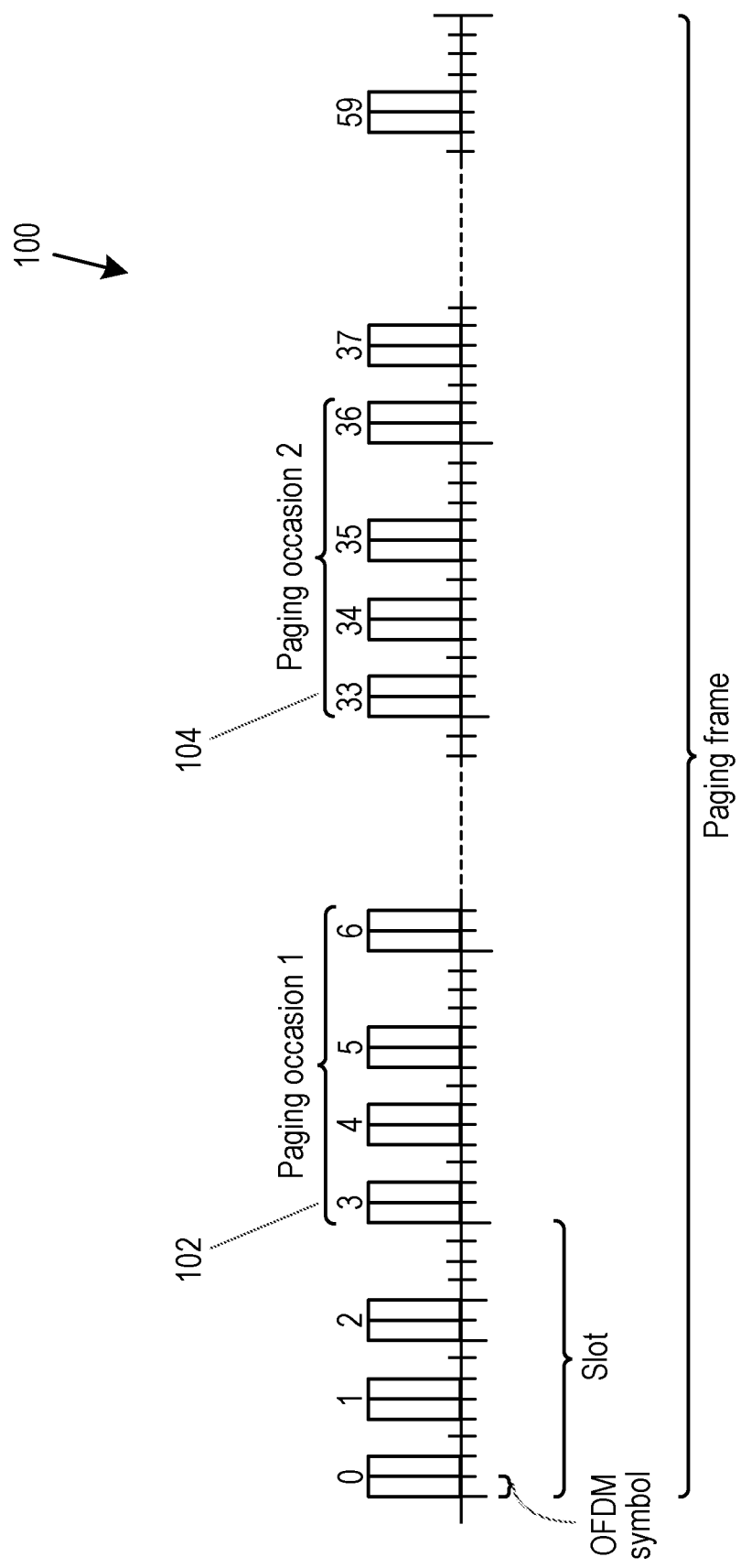
FIGS. 1 and 2 illustrate aspects of paging in a cellular network.
Figure 2:
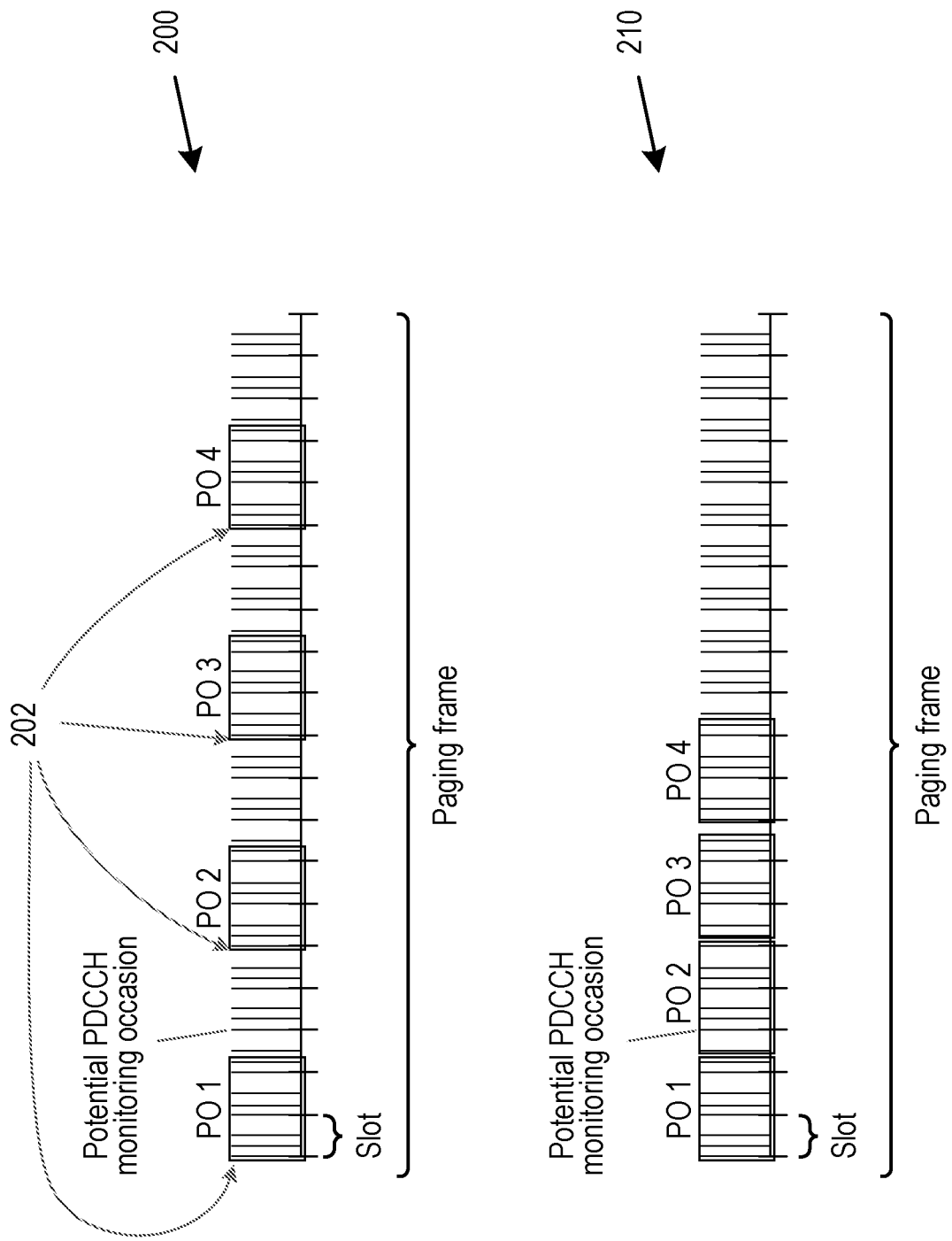
Figure 3:
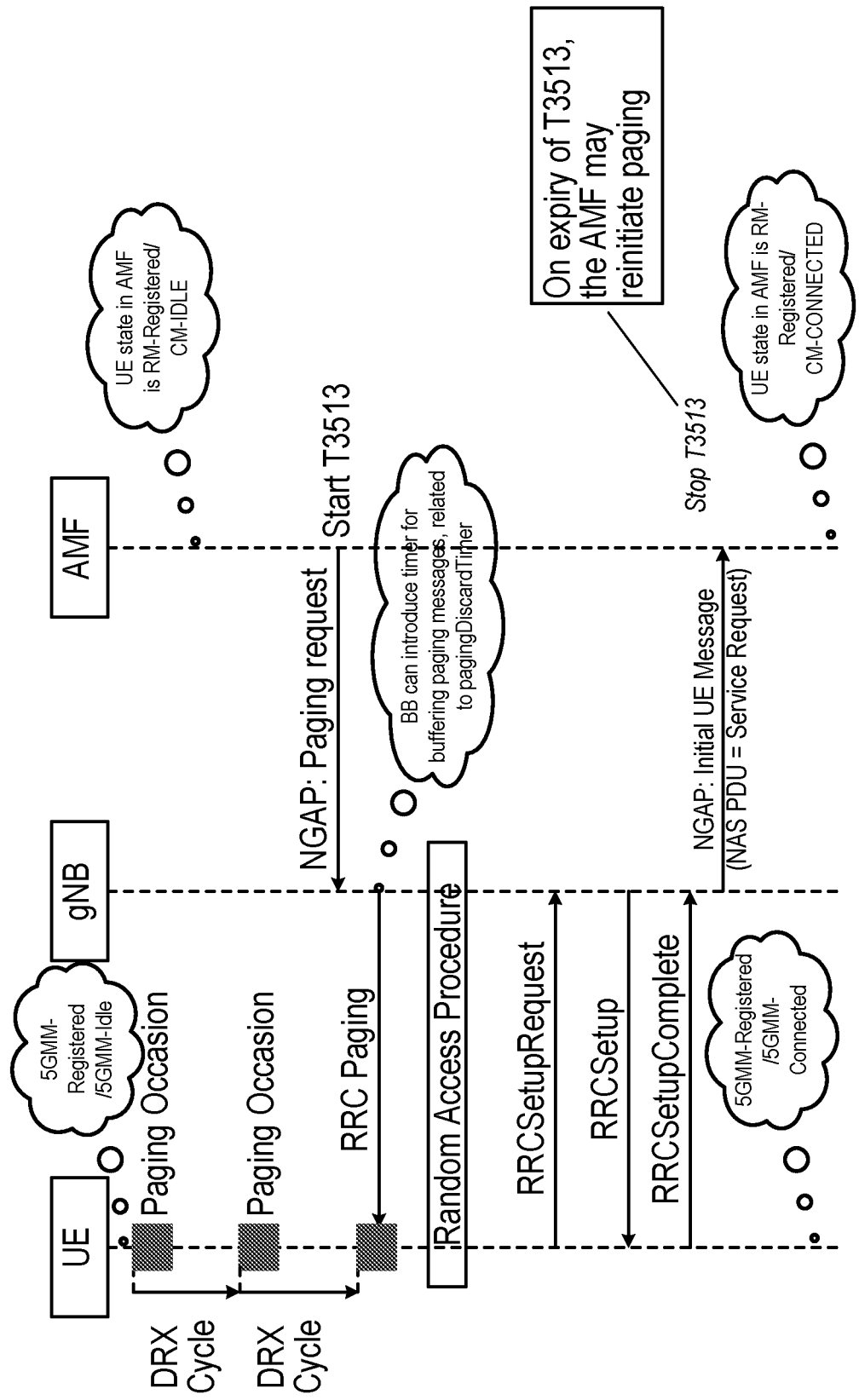
FIG. 3 is a signalling diagram illustrating a paging procedure.
Figure 4:
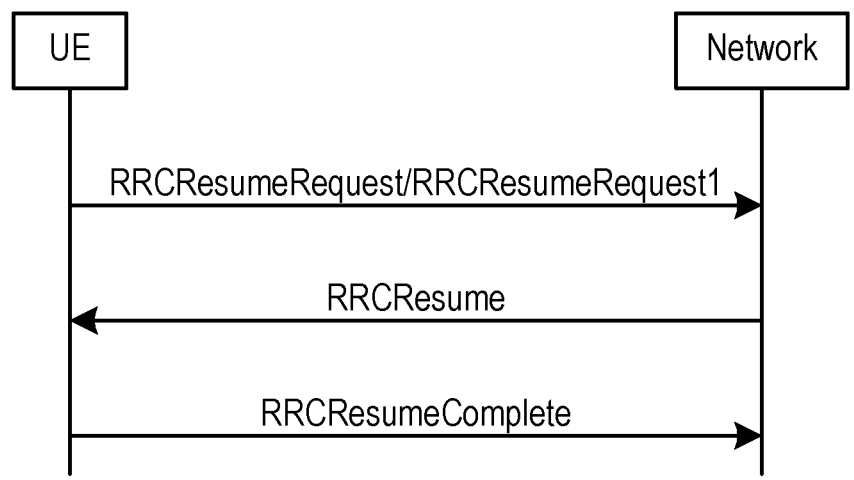
FIG. 4 is a signalling diagram illustrating a further paging procedure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In the specific embodiment described below, it is assumed that the UE is monitoring paging while in an Inactive state. However, the method is applicable for any power saving state (e.g. Idle, Inactive, etc.) where the UE may have a stored context and where the UE may be paged and resumed.

In the following description, we mainly use the terminology and examples having 5G NR as the main RAT where the UE is camping, monitoring paging and receives a paging message possibly containing an RRC Resume like message. However, that should be considered as an example, so the invention is applicable to any RAT with similar procedures i.e. UE is camping on a cell of a RAT, monitoring paging channel of a RAT and responding to a paging message containing an RRC Resume like message. In the invention we mainly use the intra-RAT case as an example, but the method is applicable for inter-RAT procedures where the UE is suspending in a first RAT (e.g. NR) and has a stored context on it. Then, the UE performs cell re-selection to another RAT (e.g. LTE) and camps in a cell of that other RAT, and monitors paging channel in that other RAT and possibly receives a resume message in that other RAT.

Certain embodiments relate to a method at a wireless terminal (also called a User Equipment—UE) for resuming an RRC connection the method comprising:

Monitoring a paging like channel while in a power saving state, for the possible reception of an RRC Resume like message (e.g. RRCResume as defined in the RRC specifications);

Receiving a paging message and determining that it includes a PDCP PDU, and determining that this is an RRC Resume like message (e.g. RRCResume as defined in the RRC specifications);

Processing the PDCP PDU (e.g. resumePaging PDCP PDU) as an SRB1 message (i.e. RRCResumePdcpPdu);

If after processing the PDCP PDU the UE detects an RRC Resume like message (e.g. RRCResume as defined in the RRC specifications), the UE perform the actions upon reception of an RRCResume in paging, such as entering RRC Connected state and submitting an RRC Resume Complete like message to lower layers in the cell the UE has received the paging message.

Figure 7:
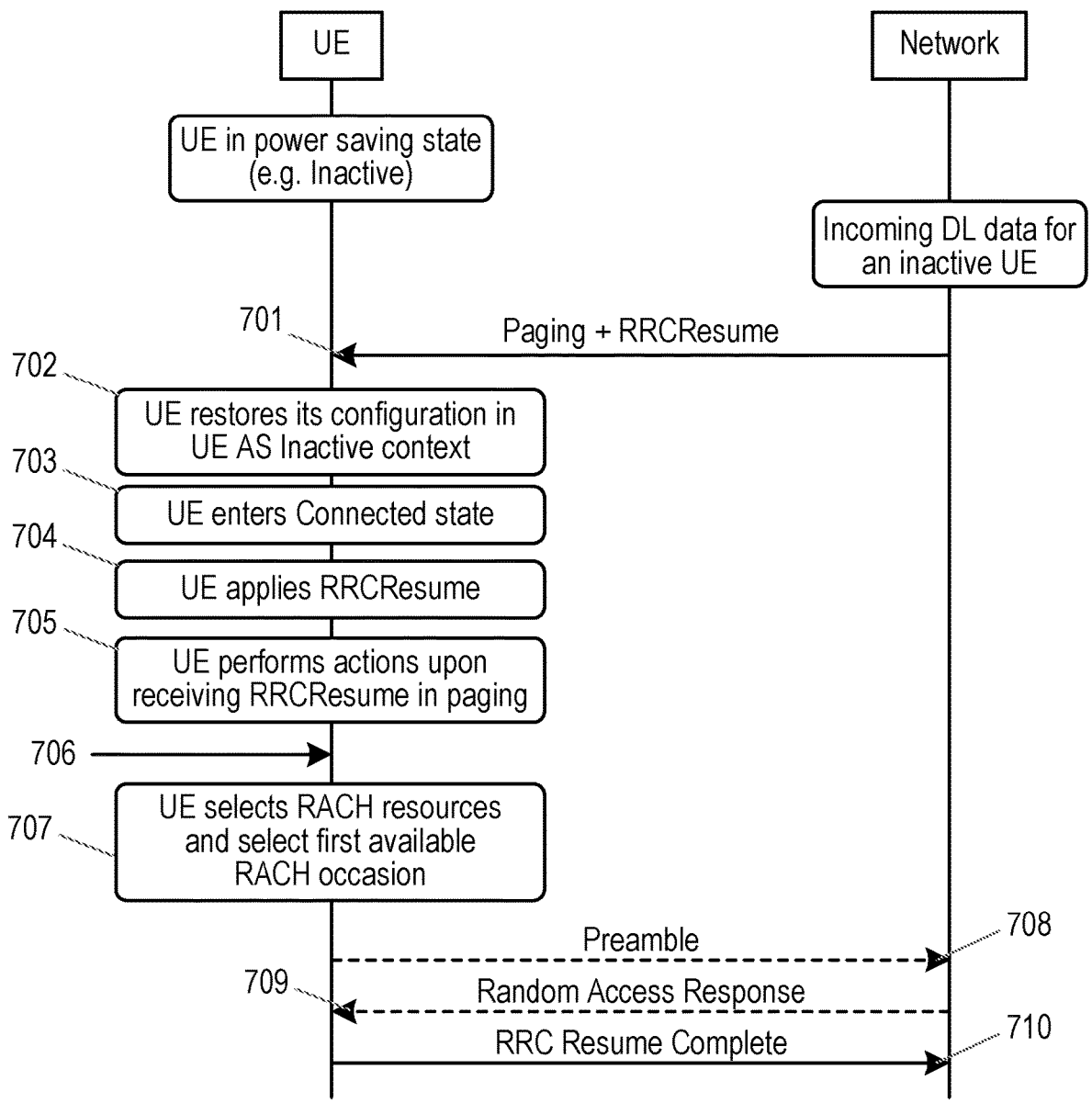
FIG. 7 is a signalling diagram illustrating a further paging procedure.

FIG. 7 is a signaling flow diagram showing the general form of the procedure.

Specifically, FIG. 7 shows a procedure in which the UE is in a power saving state, for example it is Inactive, and the network has downlink data for the Inactive UE.

At 701, the network sends a paging message with an RRC Resume like message.

In response, at 702, the UE restores its configuration in its UE AS Inactive content; at 703, the UE enters the Connected state; at 704, the UE applies RRCResume; and at 705, the UE performs actions upon receiving RRCResume in paging.

As shown at 706, the UE is now able to receive DL data according to the configuration wished by the target node.

At 707, the UE selects Random Access Channel (RACH) resources and selects the first available RACH occasion. As shown at 708, the UE then transmits a random-access preamble, then receives a random access response 709, and transmits an RRC Resume Complete like message 710.

An optional further enhancement to the procedure described above is to include the possibility to also, from the network to the UE, one or more PDCP PDUs or even MAC PDUs containing user plane (UP) data in or in conjunction with the Paging message. In this case the UE will perform the following steps:
  Receive a paging message including the UE identity;
  In the same paging message or in conjunction with the paging message receive a PDCP PDU including an RRC Resume message;
  Apply the protocol configuration as dictated in the RRC resume message;
  Decode the user plane (UP) data using the protocol configuration in the previous step.

Another optional further enhancement to the procedures above is to include indication and/or information allowing the UE to quickly move back to RRC INACTIVE state after it has executed the procedure above and/or sent UL data response to the DL data sent to the UE. Multiple options for doing this is discussed in the detailed description. Thus, a UE monitors a paging message that contains a PDCP PDU, which may comprise an RRC Resume message. Upon reception of that the UE resumes the connection and transmits an RRC Resume Complete like message.

Thus, the proposed solution allows the UE to resume faster, which enables the UE to receive DL data faster (where that data is transmitted according to a configuration wished by the target node, since a target node may modify the UE's configuration while the UE is being paged, as well as being able to reply with UL data (in response to a DL data provided to the UE) faster using the UE's configuration configured in the RRC resume message.

The benefits of this faster resumption and exchange of DL and UL data is that the device can (if it does not have any more data to send) more quickly return to sleep mode, which is advantageous for achieving low battery consumption. In current solution the UE would first need to enter CONNECTED state using a 3 step RRC procedure before it can complete the data transfer which means that the "on-time" need to be longer.

One possibility would be for the DL data to be sent directly in the paging, enabling the UE to receive the DL data without having initiated any UL signaling. A first drawback is that this would need to assume a certain decoding configuration for the DL data, most likely default, while in the method disclosed herein the network may use any configuration, since it can first resume the previous connection and possibly update the configuration for the data being transmitted. Another drawback with such solutions would be that most applications will expect UL data acknowledgement of the DL data, and to send this UL data acknowledgment the UE would need to perform a full transition to RRC Connected using the 3 step RRC procedure meaning that the "on-time" would be just as long as with the current solution. Even for applications not requiring UL data acknowledgment of the DL data there may still be a need for an UL RLC ack of the DL RLC data if RLC Acknowledgement mode is used for the Data Radio Bearer the data is used. The method disclosed herein, which may include the Resume message in the paging, is therefore more optimized to handle applications which require UL data acknowledgment on DL data or for DRBs using acknowledgment mode RLC, since the UL configuration is conveyed to the UE already in the Paging message.

The methods disclosed herein are particularly advantageous when the UE remains in the same cell in which it was last connected. For this case it can be anticipated that the UE's previous configuration (e.g., radio interface configuration) can be reused or continue to be used with no or limited/small modification/reconfiguration making it possible to keep the Resume like message included with the page very compact/small (e.g., by means of delta signalling and/or some form of reuse/no-change indication) minimizing the paging overhead. This advantage can extend also to other cells under the same gNB to which the UE was last connected and/or cells under other gNBs wherein UEs previous configuration can be reused with no or limited/small modification/reconfiguration. A small Resume like message implies less overhead when paging in multiple cells.

Detailed Description of UE Aspects of the Method

The method described herein comprises steps performed at a wireless device or wireless terminal (also called a User Equipment—UE) for resuming an RRC connection, as well as corresponding steps performed in a radio access network node, such as a base station or access point. In some embodiments, the method comprises:
  Monitoring a paging like channel while in a power saving state, for the possible reception of an RRC Resume like message;
    Power saving state may be an RRC Inactive state, RRC Idle with a stored context, RRC Idle without a stored context;
    Paging like channel may be a paging channel monitored during DRX cycles according to the configuration depending on the UE power saving state and/or the provided configuration e.g. dedicated;
    RRC Resume like message may be at least one of the messages:
      RRCResume message as defined in NR specifications (TS 38.331);
      RRCConnectionResume message as defined in LTE specifications (TS 36.331);
    A lightweight version of the RRCResume message e.g. an indication that the UE shall resume its previous configuration;
  Receiving a paging message and determining that it includes a PDCP PDU which may be an RRC Resume like message.
    The PDCP PDU could either be included in the paging message directly or sent as a separate PDCP PDU in conjunction with the paging message e.g. in the same resource block or time frame as the paging message; Another alternative is to provide in the paging message some resources mapping where the UE should look at to find the PDCP PDU;
    Note: even though we use the term PDCP PDU this could be any packet from any protocol layer below RRC carrying a message;
  Upon determining step that the paging message included an PDCP PDU which may be an RRC Resume like message, the UE performs a set of preparation actions such as:
    perform a set of preparation and clean up actions, such as:
      release the MCG SCell(s) from the UE Inactive AS context, if stored;

In one alternative solution these SCell(s) configurations are not released, since it could be assumed that the resume in paging is only for a short time e.g. to decode some DL data, and these SCell(s) may still be used next time the UE resumes and enters Connected state.

In another alternative these SCell(s) configurations are stored or released depending on configuration provided in the resume message in paging and/or based on system information indication that the cell supports the maintenance of SCell configurations.

apply the default L1 parameter values as specified in corresponding physical layer specifications, except for the parameters for which values are provided in SIB1;

In one alternative the paging message is decoded according to the PCH/PCCH configurations while the PDCP PDU is decoded according to what is described herein i.e. a default L1 parameter values.

apply the default SRB1 configuration as specified in 9.2.1 (in the NR RRC specification, or in any other place where default configurations are defined);

apply the default MAC Cell Group configuration as specified in 9.2.2 (in the NR RRC specification, or in any other place where default configurations are defined);

release delayBudgetReportingConfig from the UE Inactive AS context, if stored;

stop timer T342, if running;

release overheatingAssistanceConfig from the UE Inactive AS context, if stored;

stop timer T345, if running;

apply the timeAlignmentTimerCommon included in SIB1 restore the RRC configuration and the security context such as KgNB, keys from the UE Inactive AS context, except the masterCellGroup and pdcp-Config;

The reasoning to restore the configuration is that the network may include the resume message in the paging message. And, that message may include a delta configuration having the restored configuration as basis. The reason that masterCellGroup is an exception is that default L1/L2 is used to decode the PDCP PDU received in the paging message.

In a first alternative solution instead of L1/L2 default configurations, the UE uses the restored masterCellGroup to decode the PDCP PDU that may be the resume message;

In a second alternative solution the UE does not restore the previous configuration i.e. the Resume message in paging has the power to only be applicable for a short time i.e. while the UE process a possibly received data after that resume message and while the UE receives a subsequent RRC Release like message. In other words, the purpose of that resume in paging would be mainly to enable the UE to decode the data with a specific configuration decided by the network regardless of the UE's current configuration stored in the AS Context.

Notice that with resume in paging there is no need for the UE to compute a resume MAC-I or any other form of security token to be included in an RRC message, which represents an additional gain in terms of processing that is avoided at the UE, compared to the legacy procedure.

Similar alternatives for PDCP configuration also exist, where default is used instead of restored configuration for the processing of the PDCP PDU.

derive the KgNB key based on the current KgNB key or the NH, using the stored nextHopChainingCount (NCC) value, as specified in TS 33.501;

In an alternative solution the UE may already have derived the new keys, to be possibly used in a target cell e.g. upon reception of RRC Release and cell selection when entering a power saving state (Inactive, Idle), so that it gets prepared for that procedure in case the UE requires to decode a message according to new security keys. The UE may also update security keys and performs the steps described here upon cell reselection, to be ready for processing the resume message inside the paging.

In one solution, the NCC parameter has been provided in the RRC Release message, when the UE was suspended to Inactive state;

In another solution, the NCC parameter is provided in the RRC Resume message that is transmitted with the paging message;

derive security keys such as the KRRCenc key, the KRRCint key, the KUPint key and the KUPenc key;

These keys may be the keys for encryption and integrity protection of control plane messages; This is particularly important to decode the resume message and verify it comes from a verified network.

These keys may be the keys for encryption and integrity protection of user plane messages; This is particularly relevant for the alternative where user plane data is also transmitted together with the paging message and the resume message;

configure lower layers to apply integrity protection for all radio bearers except SRB0 using the configured algorithm and the KRRCint key and KUPint key derived in this subclause immediately, i.e., integrity protection shall be applied to all subsequent messages received and sent by the UE, including the PDCP PDU within the Paging Record;

In one alternative, this is done only for SRB1, since the UE expects an RRC Resume like message in the paging message;

configure lower layers to apply ciphering for all radio bearers except SRB0 and to apply the configured ciphering algorithm, the KRRCenc key and the KUPenc key derived in this subclause, i.e. the ciphering configuration shall be applied to all subsequent messages received and sent by the UE, including the PDCP PDU within the PagingRecord;

In one alternative, this is done only for SRB1, since the UE expects an RRC Resume like message in the paging message;

re-establish PDCP entities for SRB1;

resume SRB1;

process the PDCP PDU (e.g. resumePaging PDCP PDU) as an SRB1 message (i.e. RRCResumePdcpPdu);

This step includes verifying the integrity of the content of the PDCP PDU. The verification could include calculating a message authentication code using RRC integrity protection key and information from the payload part of the PDCP PDU and then comparing this to a message authentication code included in the PDCP PDU (e.g. in the packet header or trailer).

As well as decrypt the PDCP PDU using the RRC encryption key, to the extent the PDCP PDU is encrypted. The PDCP PDU can be encrypted, partially encrypted or unencrypted. Encrypted PDCP PDU is advantageous from privacy p-o-v. Partially encrypted or unencrypted PDCP PDU allows more flexibility w. r. t. providing new values for/update of certain security parameters, e.g., NCC parameter, key change indicator, algorithm, the values of which are needed to configure security and therefore would need to be conveyed unencrypted.

If after processing the PDCP PDU, the UE detects an RRCResume message, the UE perform the actions upon reception of an RRCResume in paging, such as entering RRC connected and submitting an RRC Resume Complete like message to lower layers. At least one of the actions is performed:
  stop performing cell reselection related measurements;
  stop timer T380 (RNA update timer);
  perform the full configuration procedure (for example, as specified in the NR RRC specification, in TS 38.331, sub-clause);
    In one alternative, that requires an indication in the resume message.
  restore the masterCellGroup and pdcp-Config from the UE Inactive AS context;
  discard the UE Inactive AS context, except the ranNotificationAreaInfo;
    The reason not to discard that is because this may be stored in Connected state, so that next time the network wants to suspend the UE it may send a delta signaling (i.e. it would not have to repeat the RAN Notification Area configuration).
  if the RRCResume includes the masterCellGroup, perform the cell group configuration for the received masterCellGroup according to 5.3.5.5 as defined in TS 38.331; This is basically the resume and possible reconfiguration of the lower layers;
  if the RRCResume includes the radioBearerConfig, perform the radio bearer configuration according to 5.3.5.6 as defined in TS 38.331;
  resume SRB2 and all DRBs, if stored, discard the cell reselection priority information provided by the cellReselectionPriorities or inherited from another RAT;
  stop timer T320, if running;
  if the RRCResume message includes the measConfig, perform the measurement configuration procedure as specified in 5.5.2 as defined in TS 38.331;
  resume measurements if suspended;
  if T390 is running, stop timer T390 for all access categories and perform the actions as specified in 5.3.14.4;
  if T302 is running, stop timer T302 and perform the actions as specified in 5.3.14.4 as defined in TS 38.331;
  enter RRC_CONNECTED;
  indicate to upper layers that the suspended RRC connection has been resumed;
    That may possibly include a new indication that the UE has been resumed via paging so upper layers may take further actions;
  stop the cell re-selection procedure;
  consider the current cell to be the PCell;
  set the content of the of RRCResumeComplete message as follows:
    if the upper layer provides NAS PDU, set the dedicatedNAS-Message to include the information received from upper layers;
    if the upper layer provides a PLMN, set the selectedPLMN-Identity to PLMN selected by upper layers (TS 24.501 [23]) from the PLMN(s) included in the plmn-IdentityList in SIB1;
    if the masterCellGroup contains the reportUplinkTxDirectCurrent:
      include the uplinkTxDirectCurrentList for each serving cell with UL;
      if UE is configured with SUL carrier:
    include uplinkDirectCurrentBWP-SUL for each serving cell with SUL within the uplinkTxDirectCurrentList;
    submit the RRCResumeComplete message to lower layers for transmission;
  the procedure ends.

A first signaling flow with the most basic solution is shown below:

Some embodiments of the method also comprise the inclusion of early transmission of the Downlink (DL) data to the UE with the Resume message in the paging message. The following options are considered:
  Sending the DL data in the paging message. In this case there is most likely a need to indicate which logical channel the data belongs to so that the UE can process the DL data using the right Data Radio Bearer. One option for sending this DL data with the page is to include the full MAC/RLC/PDCP header which contains information about the logical channel etc. Another alternative is to send the DL data as PDCP PDU(s), but include a separate indication in the paging message about which logical channel or DRB the data belongs to.
  Sending the data on normal shared DL data channel, either before even the UE has responded to the page (sent Random Access Preamble as shown in the flow), or after the UE has sent the Preamble. It is possible that information on where the DL data is sent and/or information about which C-RNTI is used to schedule the data is conveyed as part of the RRC Resume message send on the paging channel.

There could also be alternative manners to implement early DL data transmission with the Resume like message in paging, such as:
  In one embodiment, the Resume like message is a special resume only valid for some early DL data being transmitted with the paging message (or at least indicated by it). In another variant, the Resume like message is a special resume valid for some early DL data being transmitted with the paging message (or at least indicated by it) and UL data generated in response to the DL data in paging.
  In this embodiment, upon reception of an RRC Release like message e.g. after transmitting an RRC Resume Complete like message, the UE suspends the connection and discards the configuration associated to the resume message received in paging. In other words, the resume in paging procedure in this example does not change the UE AS Inactive context, but it is used to convey the configuration associated to this DL data being delivered with the paging message. In a variant of that, the message always contain a full configuration i.e. the UE does not restore the AS Inactive context upon receiving resume in paging.

In addition to including the Resume message in the paging message, it is also possible to perform early transmission of the Uplink (UL) data from the UE to the network.

The UL data could be multiplexed with the RRC Resume Complete message or send immediately after. The UL data can be a response message to the DL data provided in the page or on the DL shared data channel.

In addition to including the Resume message in the paging it is also possible to optimize the transition back to RRC_INACTIVE after DL and/or UL data has been sent. Several mechanisms for this are proposed:

An indication can be added to the RRC Resume message from the network to the UE indicating that the UE is allowed to or shall return to RRC_INACTIVE state after sending the RRC Resume Complete message and/or any UL data. The indication could include a UE suspend configuration including things like new I-RNTI, NCC parameter, RNA configuration, RNA update periodic timer etc.

An indication can be added to the RRC Resume Complete message from UE to network indicating that the UE has no more UL data to send enabling the network to quickly release the UE back to RRC_INACTIVE or to IDLE.

A buffer status report could be included in the UL data that the UE sends indicating that the UE has no more UL data to send enabling the network to quickly release the UE back to RRC_INACTIVE or to IDLE.

An indication can be included in the RRC Resume Complete message from UE to network indicating that the UE has more UL data to send and/or expects further DL data, giving the the network an opportunity to continue the connection and cancel/revoke a permission/indication/instruction to the UE to return to RRC_INACTIVE state.

After providing indication of more UL data and/or expecting DL data, the UE monitors DL for a response, potentially comprising indication to cancel/revoke return to RRC_INACTIVE and/or other instruction(s) from the network. If the network responds, the UE performs the related actions. Response from network to UE may be sent as L1, L2 or L3 message or indication. In case of unprotected response, the response may be followed by a protected message (or hand-shaking) to protect against false response. The response may indicate/instruct the UE to proceed/return to RRC_INACTIVE despite UE anticipating more UL and/or DL data. The UE monitoring for a DL response can be time limited, e.g., with a timer, after which the UE considers that the network does not intend to cancel/revoke the permission/indication/instruction to return to RRC_INACTIVE; i.e., the indication in the Resume message permitting/indicating/instructing the UE to return to RRC_INACTIVE state still apply and UE proceeds with actions to return to RRC_INACTIVE accordingly. In some embodiments of the disclosure, an indication in the RRC Resume message from the network to the UE can alternatively indicate that the UE is allowed to or shall return to RRC_IDLE.

One embodiment of a way in which the RRC specifications may be modified to implement the methods described herein is set out below.

A first possible way to implement the fact that the RRC Resume like message is transmitted with a Paging message for a UE with a power saving mode, is to extend the paging message with an RRC Resume message, for example as shown below.

Figure 5:
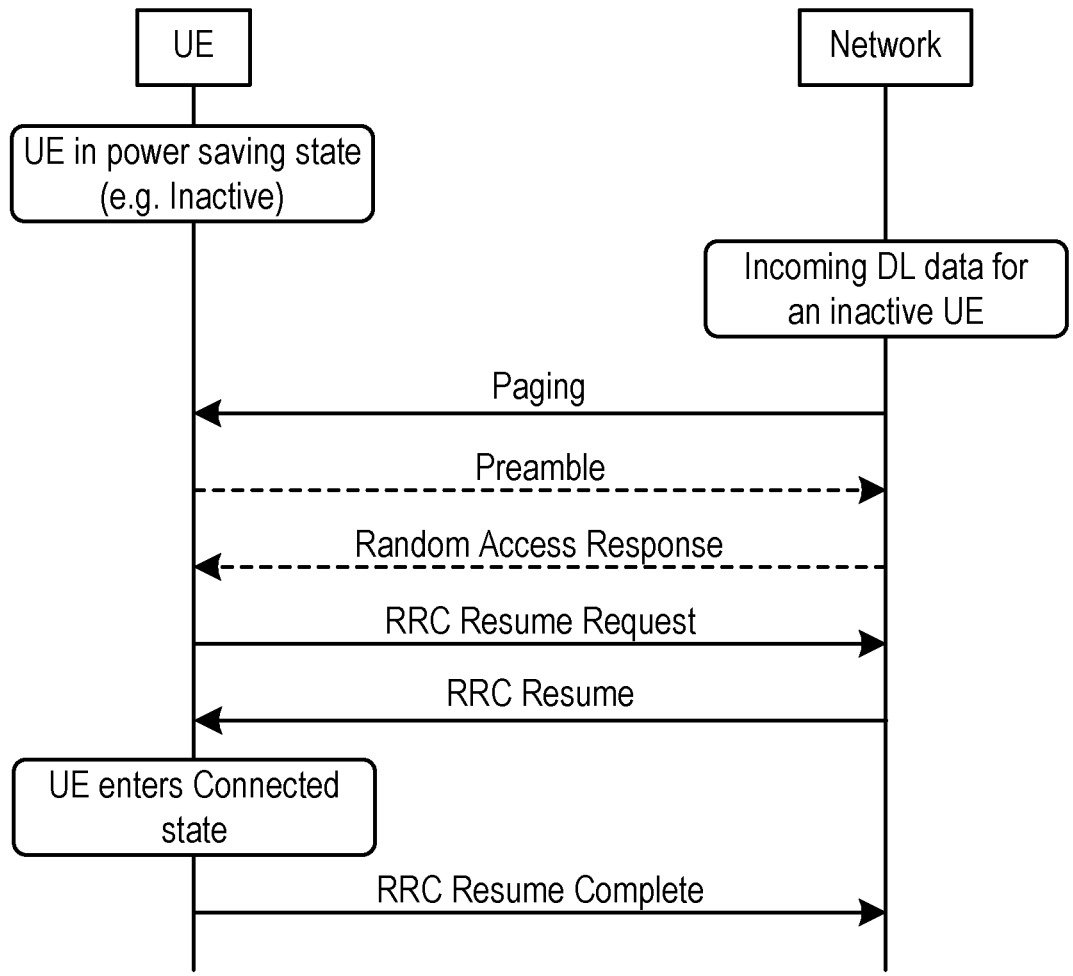
FIG. 5 is a signalling diagram illustrating a further paging procedure.
Figure 6:
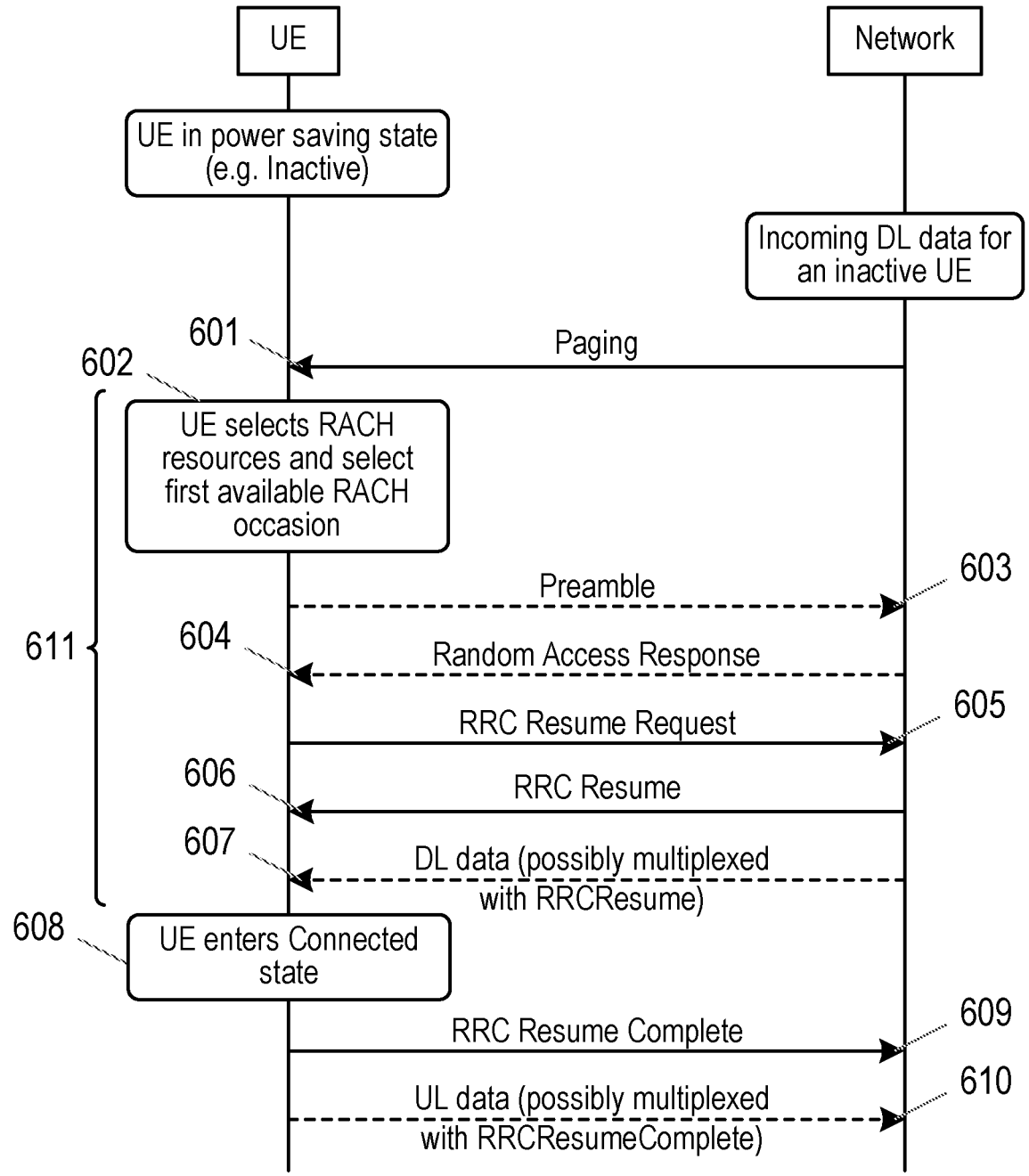
FIG. 6 is a signalling diagram illustrating a further paging procedure.
Figure 8:
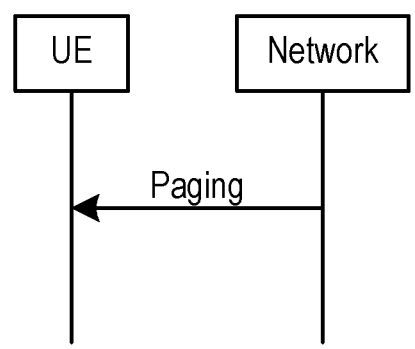
FIG. 8 is a signalling diagram illustrating a further paging procedure.

FIG. 8 is a signalling diagram corresponding to FIG. 5.3.2.1-1 in the standard, showing the general form of a paging procedure as modified by the methods described herein.

The purpose of this procedure is:
  to transmit paging information to a UE in RRC_IDLE or RRC_INACTIVE;
  to resume a UE in RRC_INACTIVE by including an RRCResume in the Paging message.

The network initiates the paging procedure by transmitting the Paging message at the UE's paging occasion as specified in TS 38.304 [20]. The network may address multiple UEs within a Paging message by including one PagingRecord for each UE.

5.3.2.3 Reception of the Paging Message by the UE
  Upon receiving the Paging message, the UE shall:
    1> if in RRC_IDLE, for each of the PagingRecord, if any, included in the Paging message:
    2> if the ue-Identity included in the PagingRecord matches the UE identity allocated by upper layers:
    3> forward the ue-Identity and accessType (if present) to the upper layers;
    1> if in RRC_INACTIVE, for each of the PagingRecord, if any, included in the Paging message:
    2> if the ue-Identity included in the PagingRecord matches the UE's stored fulll-RNTI:
    3> (newly added) if a resumePaging is included in the PagingRecord:
    4> perform the preparation actions e.g. equivalent to the resume initiation actions like sopting timers, cleaning up of variables, etc.;
    4> restore the RRC configuration and the KgNB and KRRCint keys from the UE Inactive AS context, except the masterCellGroup;
    4> derive the KgNB key based on the current KgNB key or the NH, using the stored nextHopChainingCount value, as specified in TS 33.501 [11];
    4> derive the KRRCenc key, the KRRCint key, the KUPint key and the KUPenc key;
    4> configure lower layers to apply integrity protection for all radio bearers except SRB0 using the configured algorithm and the KRRCint key and KUPint key derived in this subclause immediately, i.e., integrity protection shall be applied to all subsequent messages received and sent by the UE, including the PDCP PDU within the Paging Record;
    NOTE 1: Only DRBs with previously configured UP integrity protection shall resume integrity protection.
    4> configure lower layers to apply ciphering for all radio bearers except SRB0 and to apply the configured ciphering algorithm, the KRRCenc key and the KUPenc key derived in this subclause, i.e. the ciphering configuration shall be applied to all subsequent messages received and sent by the UE, including the PDCP PDU within the PagingRecord;
    4> re-establish PDCP entities for SRB1;
    4> resume SRB1;
    4> process the resumePaging PDCP PDU as an SRB1 message (i.e. RRCResumePdcpPdu);
    NOTE 2: Only DRBs with previously configured UP ciphering shall resume ciphering.
    3> else if the UE is configured by upper layers with Access Identity 1:
    4> initiate the RRC connection resumption procedure according to 5.3.13 with resumeCause set to mps-PriorityAccess;

3> else if the UE is configured by upper layers with Access Identity 2:
    4> initiate the RRC connection resumption procedure according to 5.3.13 with resumeCause set to mcs-PriorityAccess;
3> else if the UE is configured by upper layers with one or more Access Identities equal to 11-15:
    4> initiate the RRC connection resumption procedure according to 5.3.13 with resumeCause set to highPriorityAccess;
3> else:
    4> initiate the RRC connection resumption procedure according to 5.3.13 with resumeCause set to mt-Access;
2> else if the ue-Identity included in the PagingRecord matches the UE identity allocated by upper layers:
    3> forward the ue-Identity to upper layers and accessType (if present) to the upper layers;
    3> perform the actions upon going to RRC_IDLE as specified in 5.3.11 with release cause 'other'.

Paging

The Paging message is used for the notification of one or more UEs.

Signalling radio bearer: N/A
RLC-SAP: TM
Logical channel: PCCH
Direction: Network to UE
Paging message

```
-- ASN1START
-- TAG-PAGING-START
Paging ::=          SEQUENCE {
    pagingRecordList            PagingRecordList
OPTIONAL, -- Need N
    lateNonCriticalExtension        OCTET STRING
OPTIONAL,
    nonCriticalExtension        SEQUENCE{ }
OPTIONAL
}
PagingRecordList ::=        SEQUENCE (SIZE(1..maxNrofPageRec)) OF PagingRecord
PagingRecord ::=        SEQUENCE {
    ue-Identity     PagingUE-Identity,
    accessType              ENUMERATED {non3GPP}   OPTIONAL, -- Need N
    [
        resumePaging                OCTET STRING (CONTAINING
RRCResumePdcpPdu) OPTIONAL,-- Need M
    ],
...
}
PagingUE-Identity ::=       CHOICE {
    ng-5G-S-TMSI            NG-5G-S-TMSI,
    fulll-RNTI      I-RNTI-Value,
    ...
}
-- TAG-PAGING-STOP
-- ASN1STOP
```

5.3.13.4 Reception of the RRCResume by the UE

The UE shall:
1> stop timer T319, if running;
1> stop timer T380, if running;
1> if the RRCResume includes the fullConfig:
    2> perform the full configuration procedure as specified in 5.3.5.11;
1> else:
    2> restore the masterCellGroup and pdcp-Config from the UE Inactive AS context;
1> discard the UE Inactive AS context except the ran-NotificationAreaInfo;
1> if the RRCResume includes the masterCellGroup:
    2> perform the cell group configuration for the received masterCellGroup according to 5.3.5.5;
1> if the RRCResume includes the radioBearerConfig:
    2> perform the radio bearer configuration according to 5.3.5.6;
1> resume SRB2 and all DRBs;
1> if stored, discard the cell reselection priority information provided by the cellReselectionPriorities or inherited from another RAT;
1> stop timer T320, if running;
1> if the RRCResume message includes the measConfig:
    2> perform the measurement configuration procedure as specified in 5.5.2;
1> resume measurements if suspended;
1> if T390 is running:
    2> stop timer T390 for all access categories;
    2> perform the actions as specified in 5.3.14.4;
1> if T302 is running:
    2> stop timer T302;
    2> perform the actions as specified in 5.3.14.4;
1> enter RRC_CONNECTED;
1> indicate to upper layers that the suspended RRC connection has been resumed;
1> stop the cell re-selection procedure;
1> consider the current cell to be the PCell;
1> set the content of the of RRCResumeComplete message as follows:

2> if the upper layer provides NAS PDU, set the dedicatedNAS-Message to include the information received from upper layers;
    2> if the upper layer provides a PLMN, set the selected PLMN-Identity to PLMN selected by upper layers (TS 24.501 [23]) from the PLMN(s) included in the plmn-IdentityList in SIB1;
    2> if the masterCellGroup contains the reportUplinkTx-DirectCurrent:
        3> include the uplinkTxDirectCurrentList;
1> submit the RRCResumeComplete message to lower layers for transmission;

NOTE 1: In the case RRCResume is included in a Paging Record this will trigger a random access on MAC layer.

1>the procedure ends.

Figure 9:
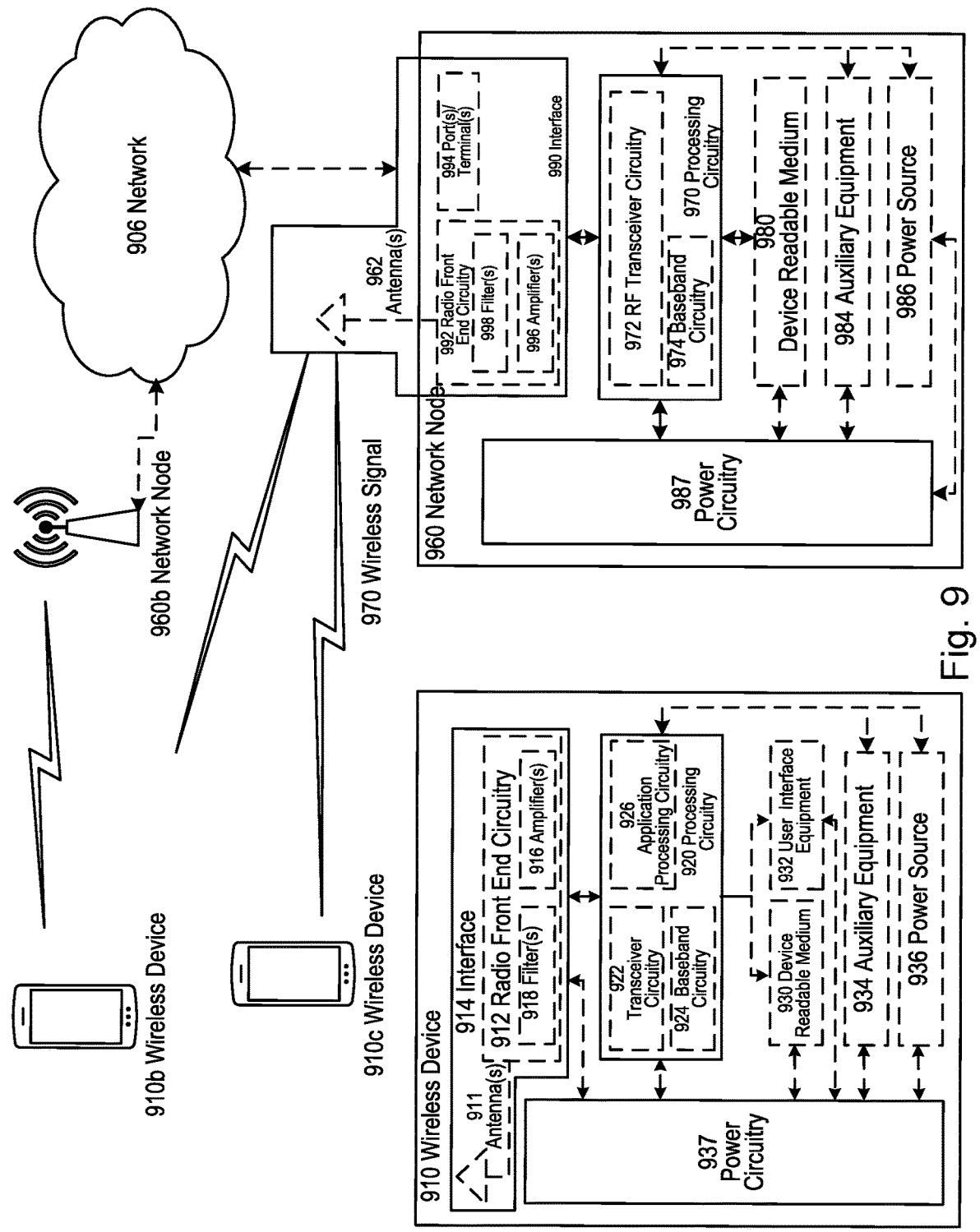
FIG. 9 shows a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960*b*, and WDs 910, 910*b*, and 910*c*. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination. Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components. In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment. Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario. Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
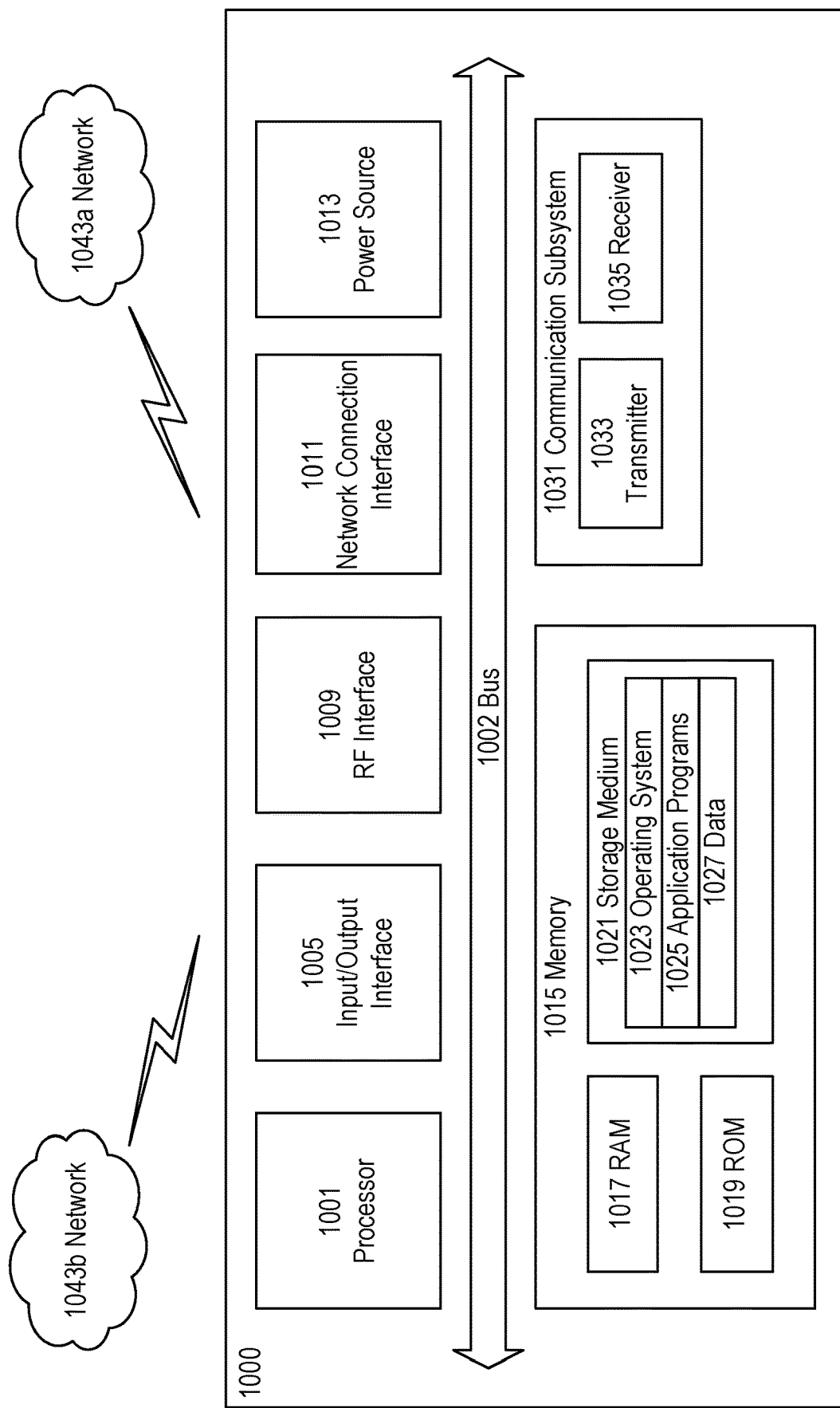
FIG. 10 shows a User Equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1000 may be any UE identified by the 3rd Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa. In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium. In FIG. 10, processing circuitry 1001 may be configured to communicate with network 1043*b* using communication subsystem 1031. Network 1043*a* and network 1043*b* may be the same network or networks or different network or networks. Communication subsystem 1031 may be configured to include one or more transceivers used to communicate with network 1043*b*. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043*b* may encompass wired and/or wireless networks such as a local-area network (LAN), a wide-area network (WAN), a computer network, a wireless network, a telecommunications network, another like network or any combination thereof. For example, network 1043*b* may be a cellular network, a Wi-Fi network, and/or a near-field network. Power source 1013 may be configured to provide alternating current (AC) or direct current (DC) power to components of UE 1000. The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
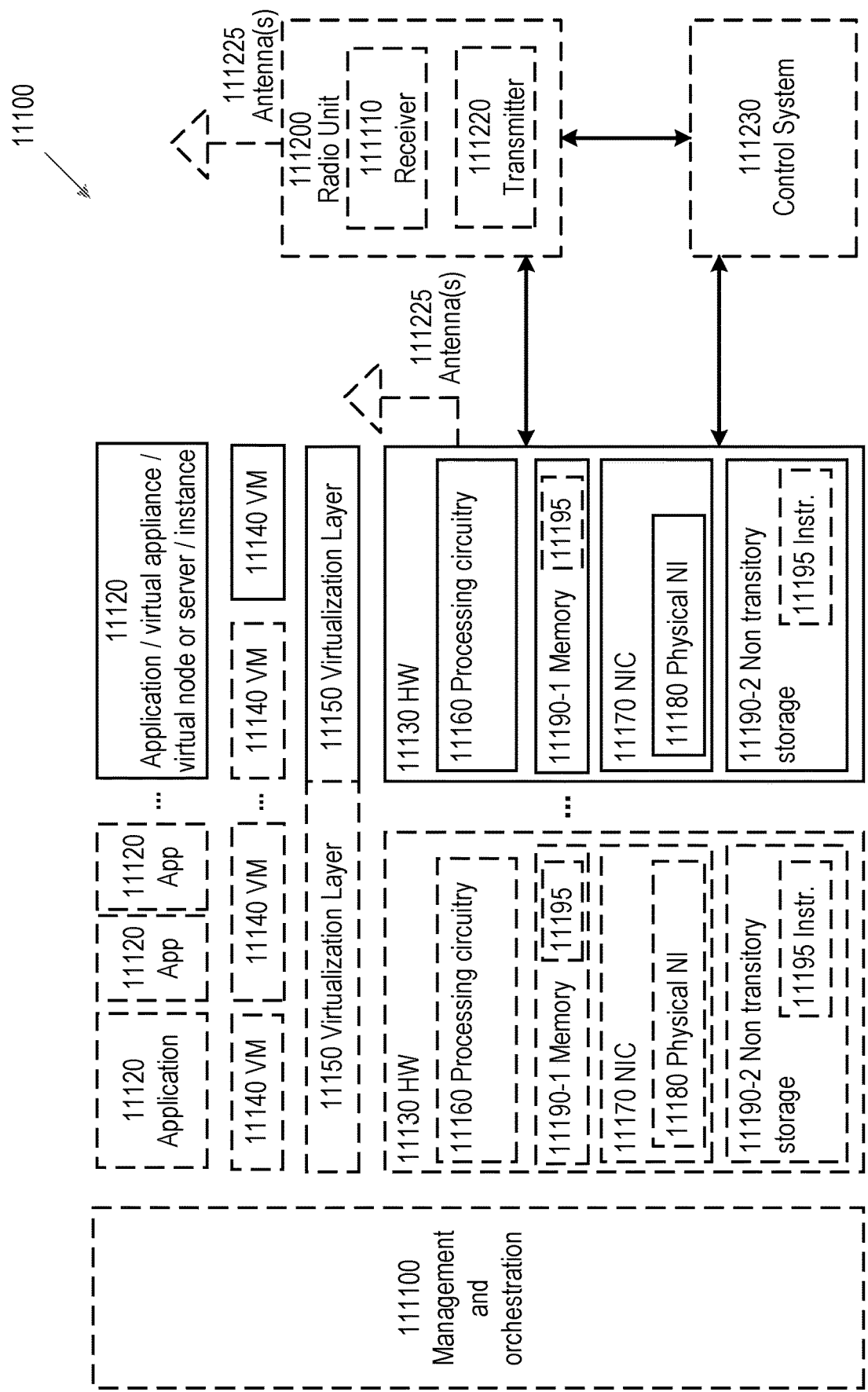
FIG. 11 shows a virtualization environment in accordance with some embodiments.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be effected with the use of control system 11230 which may alternatively be used for communication between the hardware nodes 1130 and radio units 11200.

Figure 12:
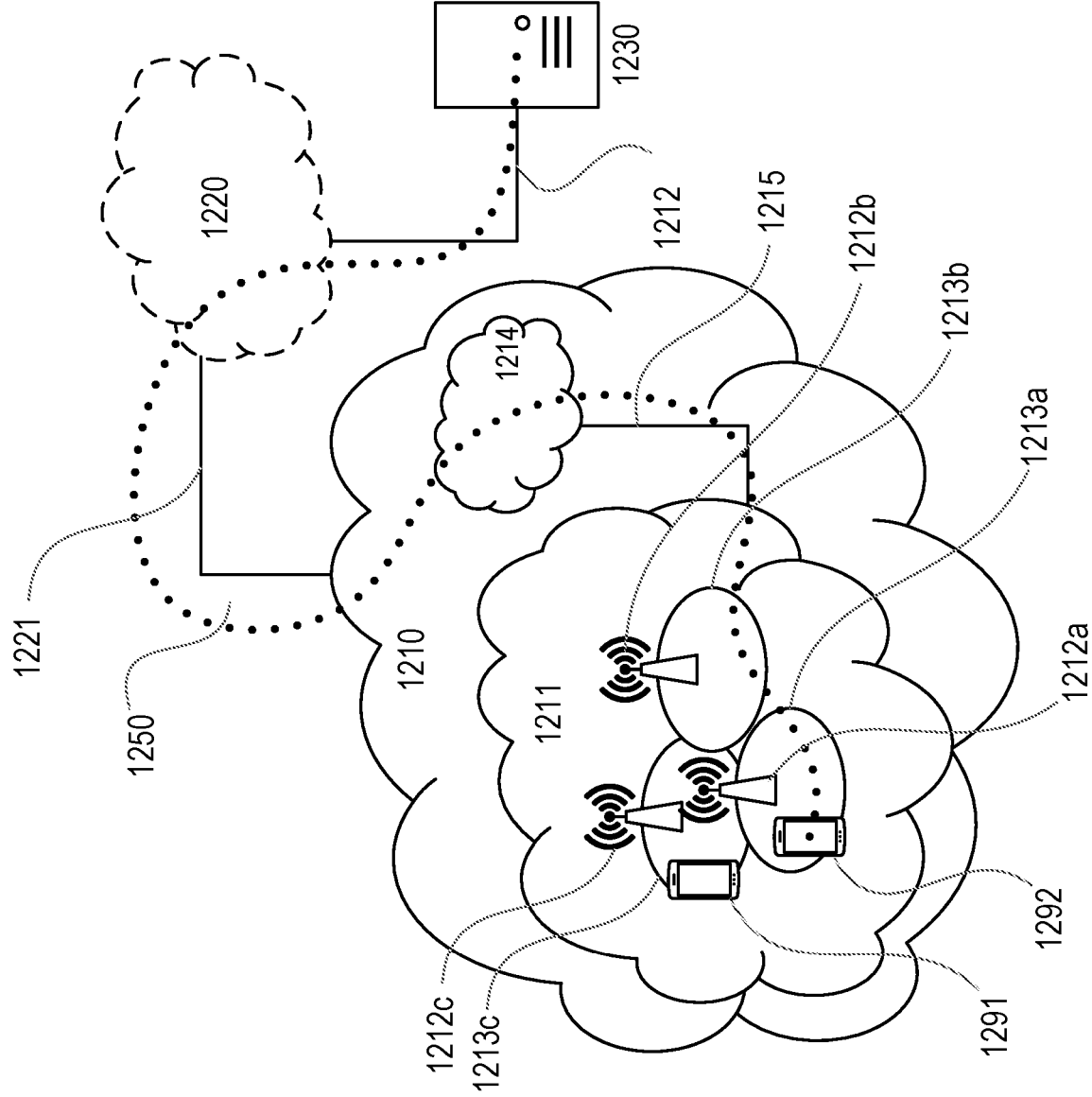
FIG. 12 shows a telecommunication network connected via an intermediate network to a host computer in accordance with some embodiments.

With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides. It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

Figure 13:
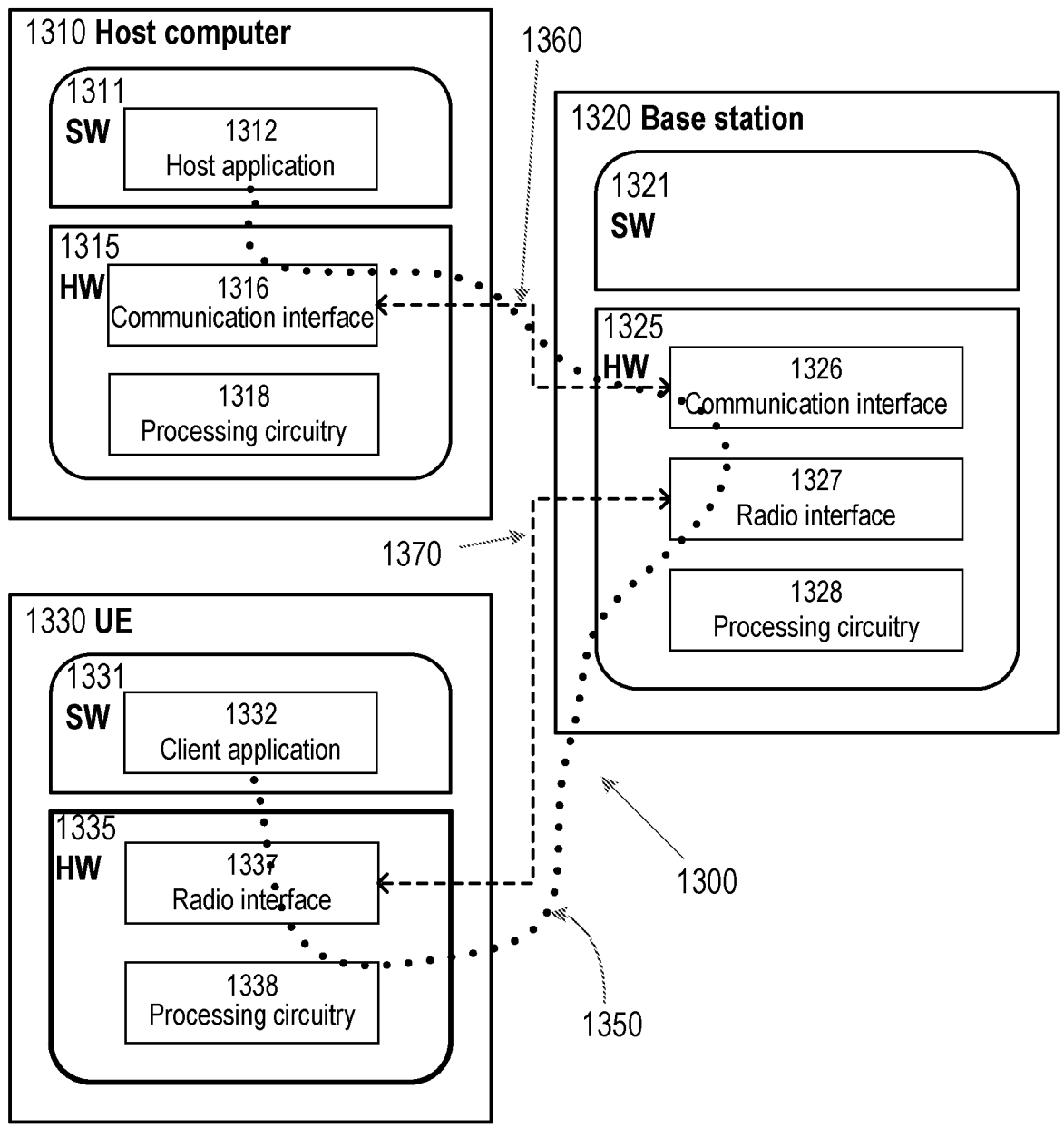
FIG. 13 shows a host computer communicating via a base station with a user equipment over a partially wireless connection in accordance with some embodiments.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network). Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve the data rate and latency of connections, and the power consumption of the wireless device, and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
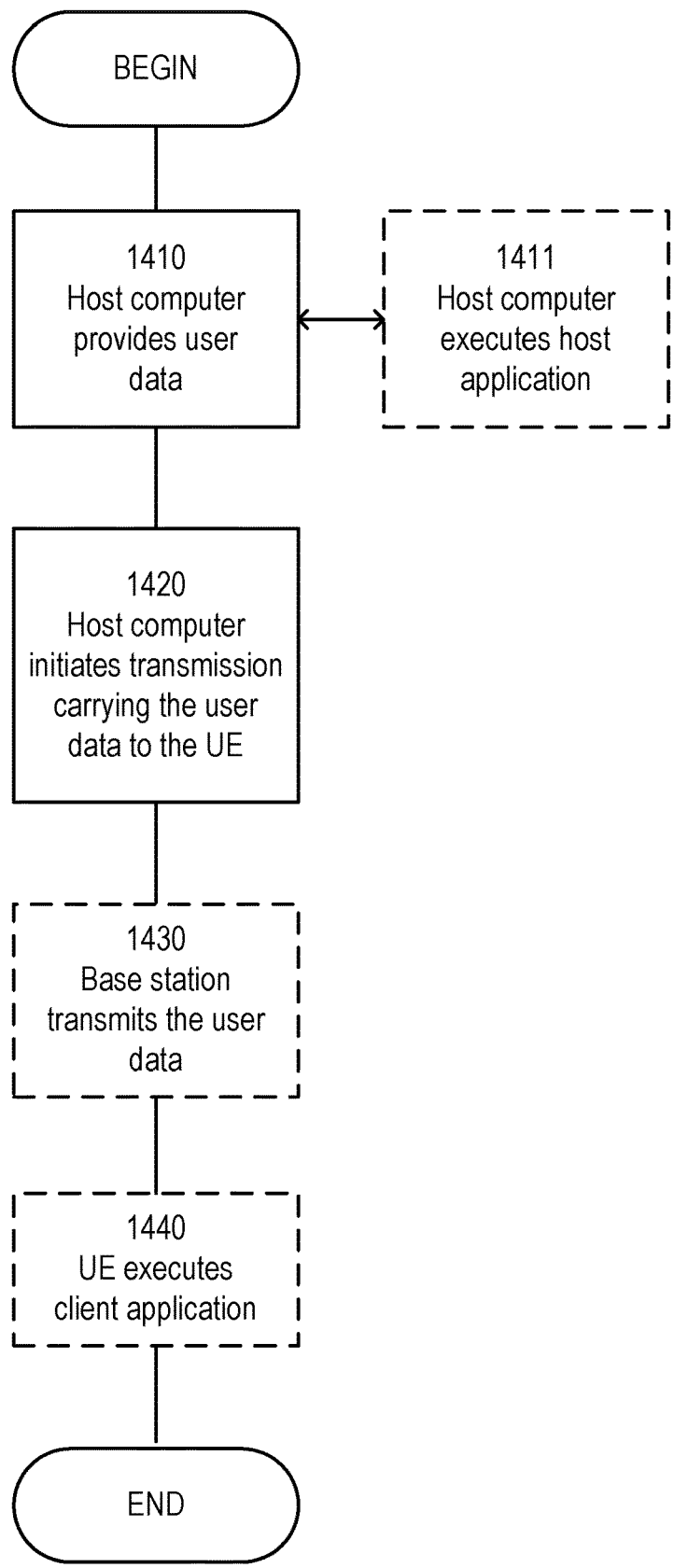
FIG. 14 shows methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
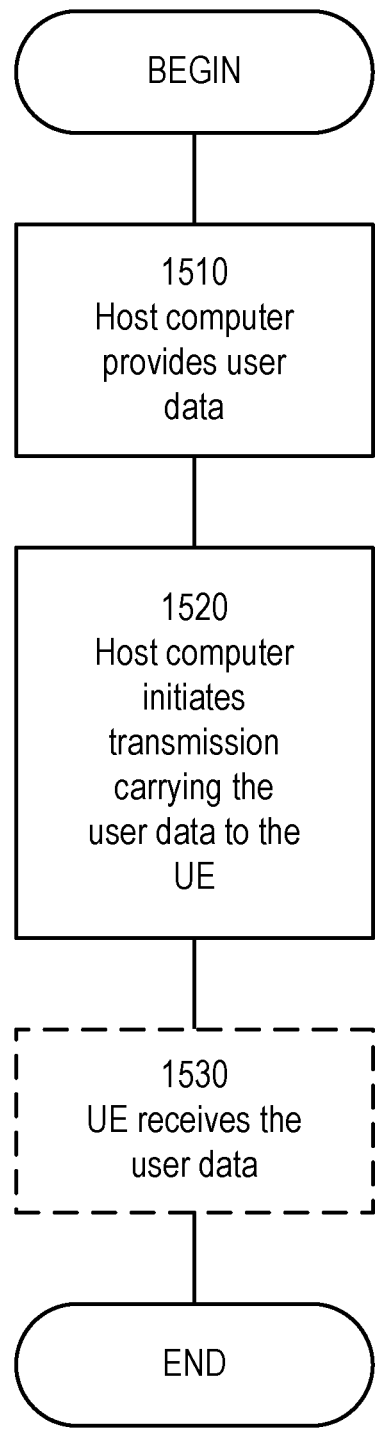
FIG. 15 shows methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
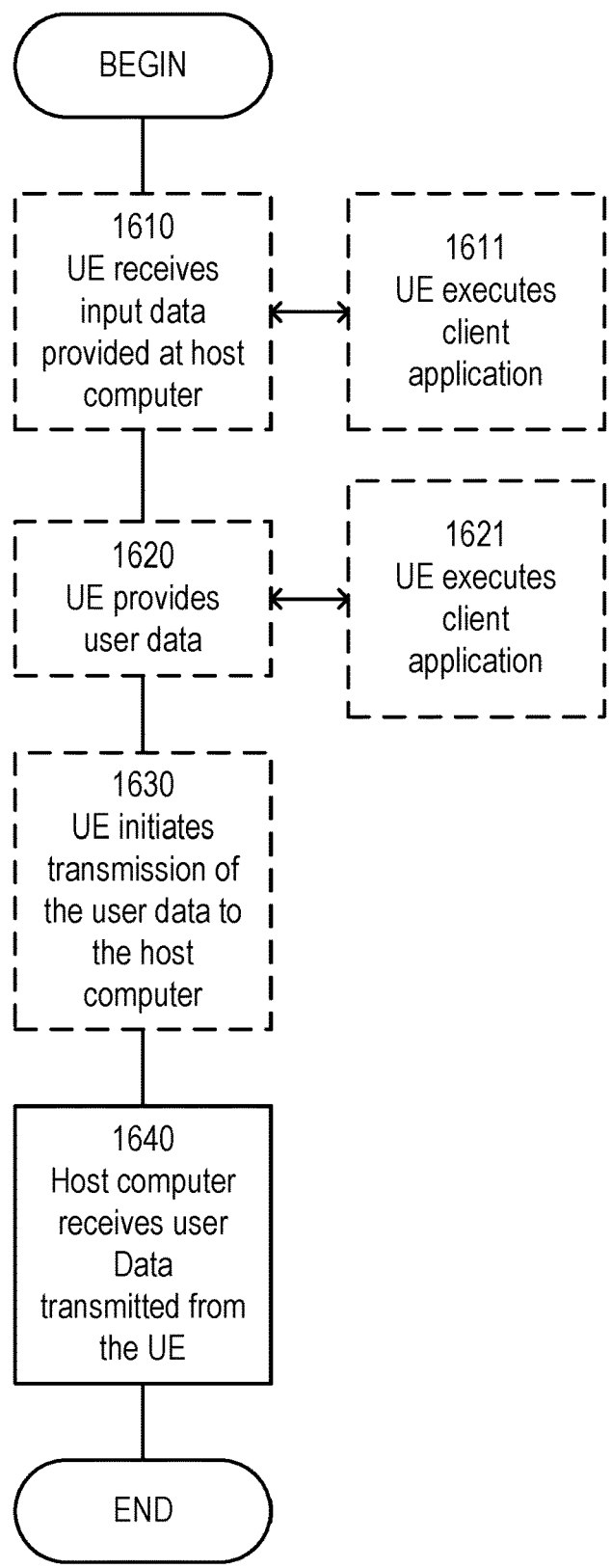
FIG. 16 shows methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
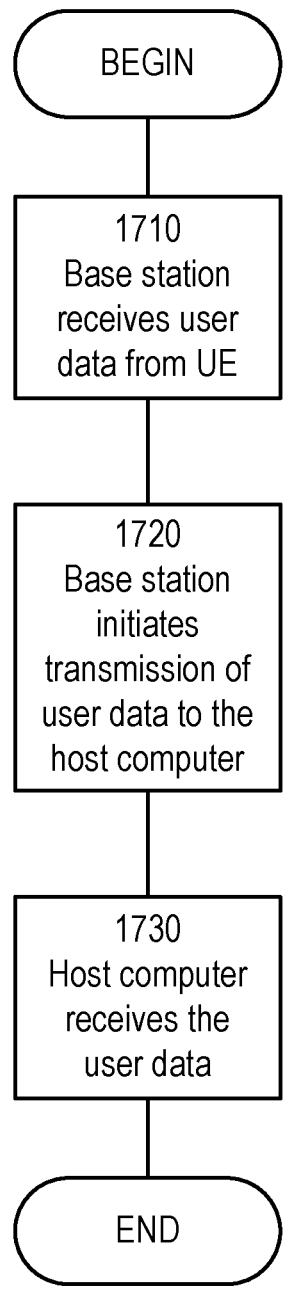
FIG. 17 shows methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units.

These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 18:
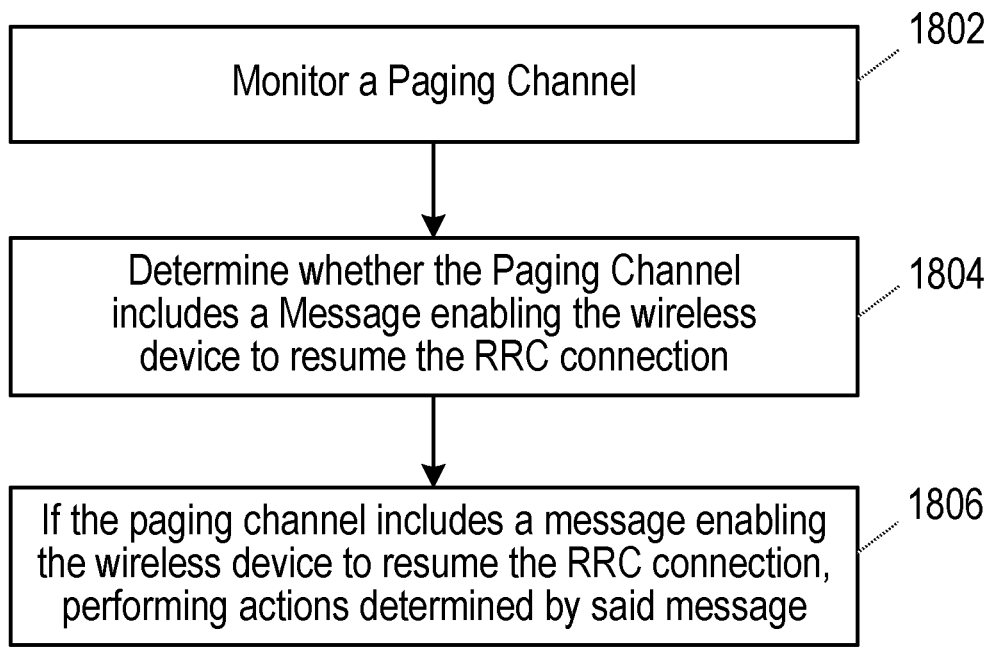
FIG. 18 is a flow diagram showing a method in accordance with some embodiments.

FIG. 18 depicts a method performed by a wireless device in accordance with particular embodiments, for resuming a Radio Resource Control, RRC, connection. The method begins at step 1802 in which, while in a power saving state, the wireless device monitors a paging channel. At step 1804, when it receives a paging message on the paging channel, the wireless device determines whether the paging channel includes a message enabling the wireless device to resume the RRC connection. If the paging channel includes a message enabling the wireless device to resume the RRC connection, at step 1806 the wireless device performs actions determined by said message.

Figure 19:
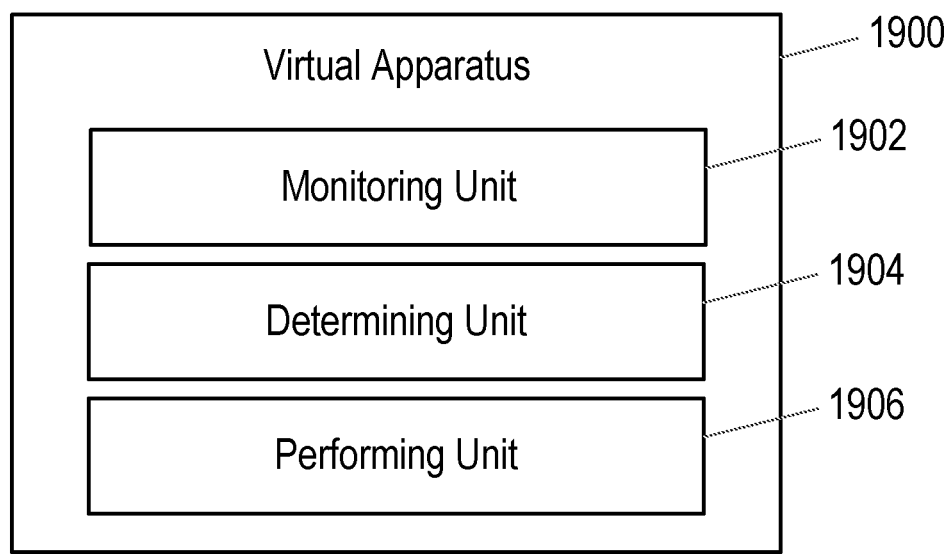
FIG. 19 illustrates a virtualization apparatus in accordance with some embodiments.

FIG. 19 is a schematic block diagram of an apparatus 1900 in a wireless network (for example, the wireless network shown in FIG. 9). The apparatus may be implemented in a wireless device or network node (e.g., wireless device 910 or network node 960 shown in FIG. 9). Apparatus 1900 is operable to carry out the example method described with reference to FIG. 18 and possibly any other processes or methods disclosed herein. It is also to be understood that the method of FIG. 18 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause monitoring unit 1902, determining unit 1904, and performing unit 1906, and any other suitable units of apparatus 1900 to perform corresponding functions according to one or more embodiments of the present disclosure.

As illustrated in FIG. 19, apparatus 1900 includes a monitoring unit 1902 configured for, while in a power saving state, monitoring a paging channel; a determining unit 1904 configured for, when receiving a paging message on the paging channel, determining whether the paging channel includes a message enabling the wireless device to resume the RRC connection; and a performing unit 1906 configured for, if the paging channel includes a message enabling the wireless device to resume the RRC connection, performing actions determined by said message.

Figure 20:
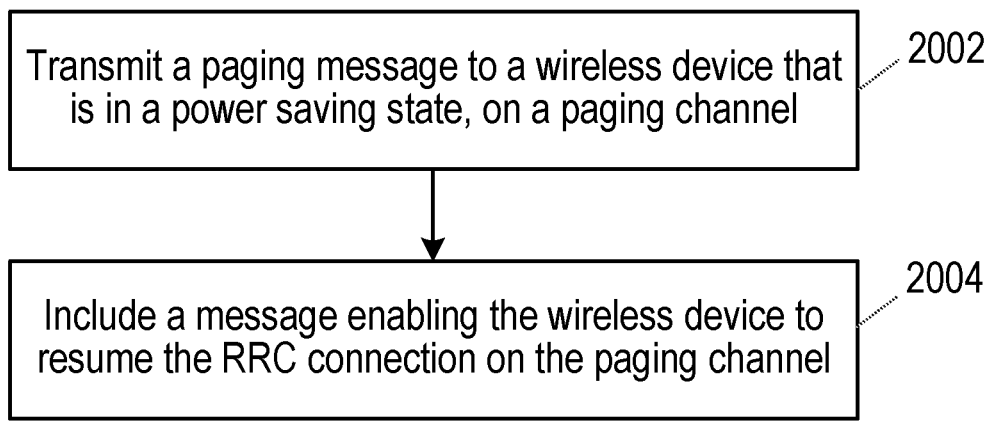
FIG. 20 is a flow diagram showing a method in accordance with some embodiments.

FIG. 20 depicts a method in accordance with particular embodiments, performed by a base station, for causing a wireless device to resume a Radio Resource Control, RRC, connection. The method begins at step 2002, with transmitting a paging message to a wireless device that is in a power saving state, on a paging channel. At step 2004, the base station includes a message enabling the wireless device to resume the RRC connection on the paging channel.

Figure 21:
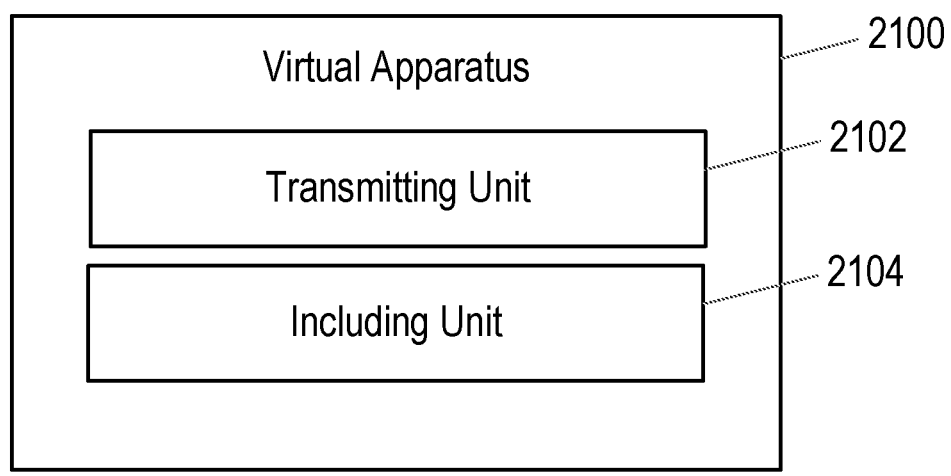
FIG. 21 illustrates a virtualization apparatus in accordance with some embodiments.

FIG. 21 illustrates a schematic block diagram of an apparatus 2100 in a wireless network (for example, the wireless network shown in FIG. 9). The apparatus may be implemented in a wireless device or network node (e.g., wireless device 910 or network node 960 shown in FIG. 9). Apparatus 2100 is operable to carry out the example method described with reference to FIG. 20 and possibly any other processes or methods disclosed herein. It is also to be understood that the method of FIG. 20 is not necessarily carried out solely by apparatus 2100. At least some operations of the method can be performed by one or more other entities.

Virtual Apparatus 2100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 2102, and including unit 2104, and any other suitable units of apparatus 2100 to perform corresponding functions according one or more embodiments of the present disclosure.

As illustrated in FIG. 21, apparatus 2100 includes transmitting unit 2102, configured for transmitting a paging message to a wireless device that is in a power saving state, on a paging channel; and including unit 2104, configured for including a message enabling the wireless device to resume the RRC connection on the paging channel. The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Various numbered embodiments of the disclosure are set out below:

Group A Embodiments

1. A method performed by a wireless device for resuming a Radio Resource Control, RRC, connection, the method comprising:
   while in a power saving state, monitoring a paging channel;
   when receiving a paging message on the paging channel, determining whether the paging channel includes a message enabling the wireless device to resume the RRC connection; and
   if the paging channel includes a message enabling the wireless device to resume the RRC connection, performing actions determined by said message.

2. The message of embodiment 1, wherein the message enabling the wireless device to resume the RRC connection comprises information about resuming the RRC connection, included in the paging message.
3. The message of embodiment 1-4, wherein the message enabling the wireless device to resume the RRC connection comprises information about resuming the RRC connection, separate from the paging message but sent in conjunction with the paging message.
4. The message of embodiment 1, wherein the message enabling the wireless device to resume the RRC connection comprises information indicating where the wireless device should look for information about resuming the RRC connection.
5. The method of any of embodiments 2-4, wherein the information about resuming the RRC connection comprises an RRCResume message.
6. The method of any of embodiments 2-4, wherein the information about resuming the RRC connection comprises an RRCConnectionResume message.
7. The method of any of embodiments 2-4, wherein the information about resuming the RRC connection comprises a message indicating that the wireless device should resume its previous configuration.
8. The method of any of embodiments 2-7, wherein the information about resuming the RRC connection comprises an indication that the wireless device can return to the power saving state when it has sent a message indicating that resuming the RRC connection is complete and/or that the wireless device has no more uplink data to send.
9. The method of any of embodiments 2-8, wherein the information about resuming the RRC connection is provided in a packet in a protocol layer below the RRC layer.
10. The method of embodiment 9, wherein the information about resuming the RRC connection is provided in a Packet Data Convergence Protocol, PDCP, Protocol Data Unit, PDU.
11. The method of any of embodiments 1-10, wherein the power saving state comprises an RRC Inactive state.
12. The method of any of embodiments 1-10, wherein the power saving state comprises an RRC Idle state with a stored context.
13. The method of any of embodiments 1-10, wherein the power saving state comprises an RRC Idle state without a stored context.
14. The method of any of embodiments 1-13, wherein the step of determining whether the paging channel includes a message enabling the wireless device to resume the RRC connection comprises:
    determining whether the paging channel includes a message that may be a message enabling the wireless device to resume the RRC connection;
    performing preparation actions and decoding the message included in the paging channel; and
    determining whether the message included in the paging channel is a message enabling the wireless device to resume the RRC connection.
15. The method of any of embodiments 1-14, wherein the actions determined by said message comprise entering an RRC Connected state.
16. The method of any of embodiments 1-15, wherein the actions determined by said message comprise sending a message indicating that resuming the RRC connection is complete.

17. The method of any of embodiments 1-16, comprising monitoring the paging channel during discontinuous reception, DRX, paging opportunities.
18. The method of any of embodiments 1-17, further comprising receiving downlink data on said paging channel.
19. The method of any of embodiments 1-17, further comprising receiving downlink data on resources identified by a message on said paging channel.
20. The method of embodiment 16, further comprising transmitting uplink data in conjunction with said message indicating that resuming the RRC connection is complete.
21. The method of embodiment 20, further comprising transmitting a message indicating that the wireless data has no more uplink data to send.
22. The method of embodiment 21, comprising transmitting said message indicating that the wireless data has no more uplink data to send in conjunction with said message indicating that resuming the RRC connection is complete.
23. The method of any of the previous embodiments, further comprising:
providing user data; and
forwarding the user data to a host computer via the transmission to the base station.

Group B Embodiments

24. A method performed by a base station for causing a wireless device to resume a Radio Resource Control, RRC, connection, the method comprising: transmitting a paging message to a wireless device that is in a power saving state, on a paging channel; and
including a message enabling the wireless device to resume the RRC connection on the paging channel.
25. The message of embodiment 24, wherein the message enabling the wireless device to resume the RRC connection comprises information about resuming the RRC connection, included in the paging message.
26. The message of embodiment 24, wherein the message enabling the wireless device to resume the RRC connection comprises information about resuming the RRC connection, separate from the paging message but sent in conjunction with the paging message.
27. The message of embodiment 24, wherein the message enabling the wireless device to resume the RRC connection comprises information indicating where the wireless device should look for information about resuming the RRC connection.
28. The method of any of embodiments 25-27, wherein the information about resuming the RRC connection comprises an RRCResume message.
29. The method of any of embodiments 25-27, wherein the information about resuming the RRC connection comprises an RRCConnectionResume message.
30. The method of any of embodiments 25-27, wherein the information about resuming the RRC connection comprises a message indicating that the wireless device should resume its previous configuration.
31. The method of any of embodiments 25-30, wherein the information about resuming the RRC connection comprises an indication that the wireless device can return to the power saving state when it has sent a message indicating that resuming the RRC connection is complete and/or that the wireless device has no more uplink data to send.
32. The method of any of embodiments 25-31, comprising providing the information about resuming the RRC connection in a packet in a protocol layer below the RRC layer.
33. The method of embodiment 32, comprising providing the information about resuming the RRC connection in a Packet Data Convergence Protocol, PDCP, Protocol Data Unit, PDU.
34. The method of any of embodiments 24-33, wherein the power saving state comprises an RRC Inactive state.
35. The method of any of embodiments 24-33, wherein the power saving state comprises an RRC Idle state with a stored context.
36. The method of any of embodiments 24-33, wherein the power saving state comprises an RRC Idle state without a stored context.
37. The method of any of embodiments 24-36, comprising transmitting the paging message during discontinuous reception, DRX, paging opportunities for the wireless device.
38. The method of any of embodiments 24-37, further comprising transmitting downlink data on said paging channel.
39. The method of any of embodiments 24-37, further comprising transmitting downlink data on first resources, and including a message identifying said first resources on said paging channel.
40. The method of any of the previous embodiments, further comprising:
obtaining user data; and
forwarding the user data to a host computer or a wireless device.

Group C Embodiments

41. A wireless device, comprising:
processing circuitry configured to perform any of the steps of any of the Group A embodiments; and
power supply circuitry configured to supply power to the wireless device.
42. A base station, comprising:
processing circuitry configured to perform any of the steps of any of the Group B embodiments;
power supply circuitry configured to supply power to the base station.
43. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
44. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

45. The communication system of embodiment 44 further including the base station.

46. The communication system of embodiment 44 or 45, further including the UE, wherein the UE is configured to communicate with the base station.

47. The communication system of embodiment 44, 45 or 46, wherein:
the processing circuitry of the host computer is configured to execute a host application, thereby providing the user data; and
the UE comprises processing circuitry configured to execute a client application associated with the host application.

48. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

49. The method of embodiment 48, further comprising, at the base station, transmitting the user data.

50. The method of embodiment 48 or 49, wherein the user data is provided at the host computer by executing a host application, the method further comprising, at the UE, executing a client application associated with the host application.

51. A user equipment (UE) configured to communicate with a base station, the UE comprising a radio interface and processing circuitry configured to perform the method of embodiment 48, 49, or 50.

52. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

53. The communication system of embodiment 52, wherein the cellular network further includes a base station configured to communicate with the UE.

54. The communication system of embodiment 52 or 53, wherein:
the processing circuitry of the host computer is configured to execute a host application, thereby providing the user data; and
the UE's processing circuitry is configured to execute a client application associated with the host application.

55. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

56. The method of embodiment 55, further comprising at the UE, receiving the user data from the base station.

57. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

58. The communication system of embodiment 57, further including the UE.

59. The communication system of embodiment 57 or 58, further including the base station, wherein the base station comprises a radio interface configured to communicate with the UE and a communication interface configured to forward to the host computer the user data carried by a transmission from the UE to the base station.

60. The communication system of embodiment 57, 58, or 59, wherein:
the processing circuitry of the host computer is configured to execute a host application; and
the UE's processing circuitry is configured to execute a client application associated with the host application, thereby providing the user data.

61. The communication system of embodiments 57, 58, 59, or 60, wherein:
the processing circuitry of the host computer is configured to execute a host application, thereby providing request data; and
the UE's processing circuitry is configured to execute a client application associated with the host application, thereby providing the user data in response to the request data.

62. A method implemented in a communication system including a host computer, a base station and a user equipment (UE), the method comprising:
at the host computer, receiving user data transmitted to the base station from the UE, wherein the UE performs any of the steps of any of the Group A embodiments.

63. The method of embodiment 62, further comprising, at the UE, providing the user data to the base station.

64. The method of embodiment 62 or 63, further comprising:
at the UE, executing a client application, thereby providing the user data to be transmitted; and
at the host computer, executing a host application associated with the client application.

65. The method of embodiment 62, 63, or 64, further comprising:
at the UE, executing a client application; and
at the UE, receiving input data to the client application, the input data being provided at the host computer by executing a host application associated with the client application, wherein the user data to be transmitted is provided by the client application in response to the input data.

66. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

67. The communication system of embodiment 66, further including the base station.

68. The communication system of embodiment 66 or 67, further including the UE, wherein the UE is configured to communicate with the base station.

69. The communication system of embodiment 66, 67, or 68, wherein:
   the processing circuitry of the host computer is configured to execute a host application;
   the UE is configured to execute a client application associated with the host application, thereby providing the user data to be received by the host computer.

70. A method implemented in a communication system including a host computer, a base station and a user equipment (UE), the method comprising:
   at the host computer, receiving, from the base station, user data originating from a transmission which the base station has received from the UE, wherein the UE performs any of the steps of any of the Group A embodiments.

71. The method of embodiment 70, further comprising at the base station, receiving the user data from the UE.

72. The method of embodiment 70 or 71, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1x RTT CDMA2000 1x Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGWServing Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for resuming a Radio Resource Control (RRC) connection, the method comprising:
while in a power saving state, monitoring a paging channel;
when receiving a paging message on the paging channel, determining whether the paging channel includes a message enabling the wireless device to resume the RRC connection; and
if the paging channel includes a message enabling the wireless device to resume the RRC connection, performing actions determined by the message, the message comprising information about resuming the RRC connection, the information about resuming the RRC connection comprising an indication that the wireless device can return to the power saving state when the wireless device has sent a message indicating one or both of: that resuming the RRC connection is complete, and that the wireless device has no more uplink data to send.

2. The method of claim 1, wherein the message enabling the wireless device to resume the RRC connection comprises the information about resuming the RRC connection, separate from the paging message but sent in conjunction with the paging message.

3. The method of claim 1, wherein the message enabling the wireless device to resume the RRC connection comprises information indicating where the wireless device should look for the information about resuming the RRC connection.

4. The method of claim 1, wherein the information about resuming the RRC connection comprises one of: an RRCResume message, or an RRCConnectionResume message.

5. The method of claim 1, wherein the information about resuming the RRC connection comprises a message indicating that the wireless device should resume a previous configuration of the wireless device.

6. The method of claim 1, wherein the information about resuming the RRC connection is provided in a packet in a protocol layer below the RRC layer.

7. The method of claim 6, wherein the information about resuming the RRC connection is provided in a Packet Data Convergence Protocol (PDCP) Protocol Data Unit (PDU).

8. The method of claim 1, wherein the step of determining whether the paging channel includes a message enabling the wireless device to resume the RRC connection comprises:
determining whether the paging channel includes a message that may be a message enabling the wireless device to resume the RRC connection;
performing preparation actions and decoding the message included in the paging channel; and
determining whether the message included in the paging channel is a message enabling the wireless device to resume the RRC connection.

9. The method of claim 1, wherein the actions determined by said message comprise one or more of: entering an RRC Connected state; restoring a configuration of the wireless device; stopping performing measurements relating to cell reselection; and selecting one or more random access resources for initiating random access.

10. The method of claim 1, wherein the actions determined by said message comprise sending a message indicating that resuming the RRC connection is complete.

11. The method of claim 10, further comprising transmitting uplink data in conjunction with said message indicating that resuming the RRC connection is complete.

12. The method of claim 11, further comprising transmitting a message indicating that the wireless data has no more uplink data to send.

13. The method of claim 12, comprising transmitting said message indicating that the wireless data has no more uplink data to send in conjunction with said message indicating that resuming the RRC connection is complete.

14. A method performed by a base station for causing a wireless device to resume a Radio Resource Control (RRC) connection, the method comprising:
transmitting a paging message to a wireless device that is in a power saving state, on a paging channel; and
including a message enabling the wireless device to resume the RRC connection on the paging channel, the message comprising information about resuming the RRC connection, the information about resuming the RRC connection comprising an indication that the wireless device can return to the power saving state when the wireless device has sent a message indicating one or both of: that resuming the RRC connection is complete, and that the wireless device has no more uplink data to send.

15. The method of claim 14, wherein the message enabling the wireless device to resume the RRC connection comprises the information about resuming the RRC connection, separate from the paging message but sent in conjunction with the paging message.

16. The method of claim 14, wherein the message enabling the wireless device to resume the RRC connection comprises information indicating where the wireless device should look for information about resuming the RRC connection.

17. The method of claim 14, wherein the information about resuming the RRC connection comprises one of an RRCResume message or an RRCConnectionResume message.

18. The method of claim 14, wherein the information about resuming the RRC connection comprises a message indicating that the wireless device should resume its previous configuration.

19. The method of claim 14, wherein the indication includes information defining a suspend configuration for the wireless device.

20. The method of claim 14, wherein the information about resuming the RRC connection is provided in a packet in a protocol layer below the RRC layer.

21. The method of claim 20, comprising providing the information about resuming the RRC connection in a Packet Data Convergence Protocol (PDCP) Protocol Data Unit (PDU).

22. The method of claim 14, further comprising transmitting downlink data on said paging channel.

23. The method of claim 14, further comprising transmitting downlink data on first resources, and including a message identifying said first resources on said paging channel.

* * * * *